US012750839B2

(12) United States Patent
Dimou et al.

(10) Patent No.: US 12,750,839 B2
(45) Date of Patent: Sep. 29, 2026

(54) TRANSMISSION OF DEFERRED FEEDBACK VIA UPLINK SHARED CHANNEL

(71) Applicant: QUALCOMM Incorporated, San Diego, CA (US)

(72) Inventors: Konstantinos Dimou, New York, NY (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 18/550,443

(22) PCT Filed: May 6, 2022

(86) PCT No.: PCT/US2022/028176
§ 371 (c)(1),
(2) Date: Sep. 13, 2023

(87) PCT Pub. No.: WO2022/240694
PCT Pub. Date: Nov. 17, 2022

(65) Prior Publication Data

US 2024/0306139 A1 Sep. 12, 2024

(30) Foreign Application Priority Data

May 10, 2021 (GR) .............................. 20210100314

(51) Int. Cl.
*H04W 72/11* (2023.01)
*H04W 72/0446* (2023.01)
*H04W 72/21* (2023.01)

(52) U.S. Cl.
CPC ........ *H04W 72/11* (2023.01); *H04W 72/0446* (2013.01); *H04W 72/21* (2023.01)

(58) Field of Classification Search
CPC ............... H04L 1/1864; H04L 5/0055; H04W 72/0446; H04W 72/21; H04W 72/11; H04W 72/23
See application file for complete search history.

(56) References Cited

U.S. PATENT DOCUMENTS

2019/0123861 A1* 4/2019 Liu ................... H04W 72/0446
2021/0211241 A1* 7/2021 Xiong ................... H04L 1/1819
(Continued)

FOREIGN PATENT DOCUMENTS

WO WO-2020222693 A1 11/2020

OTHER PUBLICATIONS

Asia Pacific Telecom: "Discussion on UE Feedback Enhancements for HARQ-ACK", 3GPP TSG-RAN WG1 Meeting #103-e, R1-2009053, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020, 4 Pages, XP051946800, Sections 1-3.
(Continued)

*Primary Examiner* — Brian D Nguyen
(74) *Attorney, Agent, or Firm* — Holland & Hart LLP

(57) ABSTRACT

Methods, systems, and devices for wireless communication at a user equipment (UE) are described. A UE may receive control signaling configuring periodic resources for receiving semi-persistent scheduled downlink transmissions and may receive a control message indicating a change to a transmission time interval format. The UE may identify a conflict for a symbol period between uplink transmission of feedback for a first semi-persistent scheduled downlink transmission and downlink reception based on the change to the transmission time interval format. The UE may then transmit, in an uplink shared channel resource of the transmission time interval format that differs from the symbol
(Continued)

period, an uplink message including uplink data multiplexed with the feedback based on the conflict.

30 Claims, 17 Drawing Sheets

(56) References Cited

U.S. PATENT DOCUMENTS

| | | | | |
|---|---|---|---|---|
| 2022/0158775 | A1* | 5/2022 | Xiong | H04L 1/1864 |
| 2022/0264568 | A1* | 8/2022 | Lin | H04L 1/1854 |
| 2022/0399978 | A1* | 12/2022 | Gao | H04L 1/1854 |
| 2022/0399979 | A1* | 12/2022 | Gao | H04L 1/1614 |
| 2023/0336315 | A1* | 10/2023 | Yin | H04W 72/11 |
| 2023/0403734 | A1* | 12/2023 | Lee | H04W 72/21 |
| 2024/0305411 | A1* | 9/2024 | Wong | H04L 5/0055 |
| 2024/0372654 | A1* | 11/2024 | He | H04W 72/232 |

OTHER PUBLICATIONS

CMCC: "Discussion on UE Feedback Enhancements for HARQ-ACK", 3GPP TSG RAN WG1 #102-e, R1-2006207, 3rd Generation Partnership Project, Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 7, 2020, 3 Pages, XP051915247, Figure 1, Sections 1-3.

International Search Report and Written Opinion—PCT/US2022/028176—ISA/EPO—Aug. 25, 2022.

* cited by examiner

100

TRANSMISSION OF DEFERRED FEEDBACK VIA UPLINK SHARED CHANNEL

CROSS REFERENCE

The present application is a 371 national stage filing of International PCT Application No. PCT/US2022/028176 by DIMOU et al. entitled "TRANSMISSION OF DEFERRED FEEDBACK VIA UPLINK SHARED CHANNEL," filed May 6, 2022; and claims priority to Greece patent Application No. 20210100314 by DIMOU et al., entitled "TRANSMISSION OF DEFERRED FEEDBACK VIA UPLINK SHARED CHANNEL," filed May 10, 2021, each of which is assigned to the assignee hereof, and each of which is expressly incorporated by reference in its entirety herein.

FIELD OF TECHNOLOGY

The following relates to wireless communication at a user equipment (UE), including transmission of deferred feedback via uplink shared channel.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more network entities or one or more network access nodes, each simultaneously supporting communication for multiple communication devices, which may be otherwise known as user equipment (UE). In some wireless communications systems, a network entity may configure UEs for feedback transmission. However, in some examples, feedback transmission techniques may be deficient.

SUMMARY

The described techniques relate to improved methods, systems, devices, and apparatuses that support transmission of deferred feedback via uplink shared channel. Generally, the described techniques provide for a method for feedback transmission in case of a conflict between a symbol period allocated for feedback transmission for a semi-persistent scheduled downlink transmission and for downlink reception. In particular, according to aspects depicted herein, a UE may defer the feedback transmission until an uplink shared channel resource instead of transmitting in the first available control channel. In some examples, the UE may receive a control signaling configuring periodic resources for receiving semi-persistent scheduled downlink transmissions. The UE may then receive a control message indicating a change to a transmission time interval format. Upon receiving the control message, the UE may identify a conflict for a symbol period between uplink transmission of feedback for a first semi-persistent scheduled downlink transmission and downlink reception based on the change to the transmission time interval format.

In some examples, the UE may receive a respective semi-persistent scheduled downlink transmission of the semi-persistent scheduled downlink transmissions via the periodic resources based on the control signaling. The UE may transmit, in an uplink shared channel resource of the transmission time interval format that differs from the symbol period, an uplink message including uplink data multiplexed with the feedback based on the conflict. For example, in an uplink shared channel resource of a transmission time interval format, the UE may multiplex the deferred feedback with uplink data.

A method for wireless communication at a user equipment (UE) is described. The method may include receiving control signaling configuring periodic resources for receiving semi-persistent scheduled downlink transmissions, receiving a control message indicating a change to a transmission time interval format, identifying a conflict for a symbol period between uplink transmission of feedback for a first semi-persistent scheduled downlink transmission and downlink reception based on the change to the transmission time interval format, and transmitting, in an uplink shared channel resource of the transmission time interval format that differs from the symbol period, an uplink message including uplink data multiplexed with the feedback based on the conflict.

An apparatus for wireless communication at a UE is described. The apparatus may include a processor, memory coupled with the processor, and instructions stored in the memory. The instructions may be executable by the processor to cause the apparatus to receive control signaling configuring periodic resources for receiving semi-persistent scheduled downlink transmissions, receive a control message indicating a change to a transmission time interval format, identify a conflict for a symbol period between uplink transmission of feedback for a first semi-persistent scheduled downlink transmission and downlink reception based on the change to the transmission time interval format, and transmit, in an uplink shared channel resource of the transmission time interval format that differs from the symbol period, an uplink message including uplink data multiplexed with the feedback based on the conflict.

Another apparatus for wireless communication at a UE is described. The apparatus may include means for receiving control signaling configuring periodic resources for receiving semi-persistent scheduled downlink transmissions, means for receiving a control message indicating a change to a transmission time interval format, means for identifying a conflict for a symbol period between uplink transmission of feedback for a first semi-persistent scheduled downlink transmission and downlink reception based on the change to the transmission time interval format, and means for transmitting, in an uplink shared channel resource of the transmission time interval format that differs from the symbol period, an uplink message including uplink data multiplexed with the feedback based on the conflict.

A non-transitory computer-readable medium storing code for wireless communication at a UE is described. The code may include instructions executable by a processor to receive control signaling configuring periodic resources for receiving semi-persistent scheduled downlink transmissions, receive a control message indicating a change to a transmission time interval format, identify a conflict for a symbol period between uplink transmission of feedback for a first semi-persistent scheduled downlink transmission and downlink reception based on the change to the transmission time interval format, and transmit, in an uplink shared channel resource of the transmission time interval format that differs from the symbol period, an uplink message including uplink data multiplexed with the feedback based on the conflict.

Some examples of the method, apparatuses, and non-transitory computer-readable medium described herein may further include operations, features, means, or instructions for receiving a grant indicating the uplink shared channel resource that occurs after an uplink control channel resource of the transmission time interval format.

Some examples of the method, apparatuses, and non-transitory computer-readable medium described herein may further include operations, features, means, or instructions for receiving a respective semi-persistent scheduled downlink transmission of the semi-persistent scheduled downlink transmissions via the periodic resources based on the control signaling.

Some examples of the method, apparatuses, and non-transitory computer-readable medium described herein may further include operations, features, means, or instructions for receiving a grant indicating the uplink shared channel resource that occurs after an uplink control channel resource of the transmission time interval format and prior to an end of a feedback deferral time window associated with providing the feedback for the first semi-persistent scheduled downlink transmission.

In some examples of the method, apparatuses, and non-transitory computer-readable medium described herein, transmitting the uplink message may include operations, features, means, or instructions for transmitting the uplink message including the uplink data multiplexed with the feedback based on an allocated size of the uplink shared channel resource being sufficient to transport the uplink message. In some examples of the method, apparatuses, and non-transitory computer-readable medium described herein, transmitting the uplink message may include operations, features, means, or instructions for transmitting the uplink message in the uplink shared channel resource that occurs after an uplink control channel resource.

Some examples of the method, apparatuses, and non-transitory computer-readable medium described herein may further include operations, features, means, or instructions for receiving a grant indicating the uplink shared channel resource that occurs after an uplink control channel resource of the transmission time interval format and after a feedback deferral time window associated with providing a deferred feedback and transmitting the deferred feedback in the uplink control channel resource.

Some examples of the method, apparatuses, and non-transitory computer-readable medium described herein may further include operations, features, means, or instructions for receiving second control signaling indicating a configured grant resource and transmitting the uplink message in the uplink shared channel resource within the configured grant resource.

In some examples of the method, apparatuses, and non-transitory computer-readable medium described herein, transmitting the uplink message may include operations, features, means, or instructions for transmitting the uplink message including the uplink data that may be multiplexed with the feedback, the uplink data including a scheduling request, channel state information, or both.

In some examples of the method, apparatuses, and non-transitory computer-readable medium described herein, the feedback may be associated with a most recent semi-persistent scheduled downlink transmission of the semi-persistent scheduled downlink transmissions that may be prioritized relative to deferred feedback for an earlier semi-persistent scheduled downlink transmission of the semi-persistent scheduled downlink transmissions.

Some examples of the method, apparatuses, and non-transitory computer-readable medium described herein may further include operations, features, means, or instructions for dropping deferred feedback corresponding to a prior semi-persistent scheduled downlink transmission based on an allocated size of the uplink shared channel resource being insufficient to transport the deferred feedback in the uplink message. In some examples of the method, apparatuses, and non-transitory computer-readable medium described herein, the feedback includes one or more bits. In some examples of the method, apparatuses, and non-transitory computer-readable medium described herein, the uplink shared channel resource includes a scheduled uplink shared channel resource.

A method for wireless communication at a network entity is described. The method may include transmitting control signaling configuring periodic resources for receiving semi-persistent scheduled downlink transmissions, transmitting a control message indicating a change to a transmission time interval format, identifying a conflict for a symbol period between uplink transmission of feedback for a first semi-persistent scheduled downlink transmission and for downlink reception based on the change to the transmission time interval format, and receiving, in an uplink shared channel resource of the transmission time interval format that differs from the symbol period, an uplink message including uplink data multiplexed with the feedback based on the conflict.

An apparatus for wireless communication at a network entity is described. The apparatus may include a processor, memory coupled with the processor, and instructions stored in the memory. The instructions may be executable by the processor to cause the apparatus to transmit control signaling configuring periodic resources for receiving semi-persistent scheduled downlink transmissions, transmit a control message indicating a change to a transmission time interval format, identify a conflict for a symbol period between uplink transmission of feedback for a first semi-persistent scheduled downlink transmission and for downlink reception based on the change to the transmission time interval format, and receive, in an uplink shared channel resource of the transmission time interval format that differs from the symbol period, an uplink message including uplink data multiplexed with the feedback based on the conflict.

Another apparatus for wireless communication at a network entity is described. The apparatus may include means for transmitting control signaling configuring periodic resources for receiving semi-persistent scheduled downlink transmissions, means for transmitting a control message indicating a change to a transmission time interval format, means for identifying a conflict for a symbol period between uplink transmission of feedback for a first semi-persistent scheduled downlink transmission and for downlink reception based on the change to the transmission time interval format, and means for receiving, in an uplink shared channel resource of the transmission time interval format that differs from the symbol period, an uplink message including uplink data multiplexed with the feedback based on the conflict.

A non-transitory computer-readable medium storing code for wireless communication at a network entity is described. The code may include instructions executable by a processor to transmit control signaling configuring periodic resources for receiving semi-persistent scheduled downlink transmissions, transmit a control message indicating a change to a transmission time interval format, identify a conflict for a symbol period between uplink transmission of feedback for a first semi-persistent scheduled downlink transmission and for downlink reception based on the change to the transmission time interval format, and receive, in an uplink shared channel resource of the transmission time interval format that differs from the symbol period, an uplink message including uplink data multiplexed with the feedback based on the conflict.

Some examples of the method, apparatuses, and non-transitory computer-readable medium described herein may further include operations, features, means, or instructions for transmitting a grant indicating the uplink shared channel resource that occurs after an uplink control channel resource of the transmission time interval format. Some examples of the method, apparatuses, and non-transitory computer-readable medium described herein may further include operations, features, means, or instructions for transmitting a respective semi-persistent scheduled downlink transmission of the semi-persistent scheduled downlink transmissions via the periodic resources based on the control signaling.

Some examples of the method, apparatuses, and non-transitory computer-readable medium described herein may further include operations, features, means, or instructions for transmitting a grant indicating the uplink shared channel resource that occurs after an uplink control channel resource of the transmission time interval format and prior to an end of a feedback deferral time window associated with providing the feedback for the first semi-persistent scheduled downlink transmission.

In some examples of the method, apparatuses, and non-transitory computer-readable medium described herein, receiving the uplink message may include operations, features, means, or instructions for receiving the uplink message including the uplink data multiplexed with the feedback based on an allocated size of the uplink shared channel resource being sufficient to transport the uplink message. In some examples of the method, apparatuses, and non-transitory computer-readable medium described herein, receiving the uplink message may include operations, features, means, or instructions for receiving the uplink message in the uplink shared channel resource that occurs after an uplink control channel resource.

Some examples of the method, apparatuses, and non-transitory computer-readable medium described herein may further include operations, features, means, or instructions for transmitting a grant indicating the uplink shared channel resource that occurs after an uplink control channel resource of the transmission time interval format and after a feedback deferral time window associated with providing a deferred feedback and receiving the deferred feedback in the uplink control channel resource.

Some examples of the method, apparatuses, and non-transitory computer-readable medium described herein may further include operations, features, means, or instructions for transmitting second control signaling indicating a configured grant resource and receiving the uplink message in the uplink shared channel resource within the configured grant resource.

In some examples of the method, apparatuses, and non-transitory computer-readable medium described herein, receiving the uplink message may include operations, features, means, or instructions for receiving the uplink message including the uplink data that may be multiplexed with the feedback, the uplink data including a scheduling request, channel state information, or both.

In some examples of the method, apparatuses, and non-transitory computer-readable medium described herein, the feedback may be associated with a most recent semi-persistent scheduled downlink transmission of the semi-persistent scheduled downlink transmissions that may be prioritized relative to deferred feedback for an earlier semi-persistent scheduled downlink transmission of the semi-persistent scheduled downlink transmissions.

Some examples of the method, apparatuses, and non-transitory computer-readable medium described herein may further include operations, features, means, or instructions for transmitting an indication to drop deferred feedback corresponding to a prior semi-persistent scheduled downlink transmission based on an allocated size of the uplink shared channel resource being insufficient to transport the deferred feedback in the uplink message.

In some examples of the method, apparatuses, and non-transitory computer-readable medium described herein, the feedback includes one or more bits. In some examples of the method, apparatuses, and non-transitory computer-readable medium described herein, the uplink shared channel resource includes a scheduled uplink shared channel resource.

DETAILED DESCRIPTION

Figure 1:
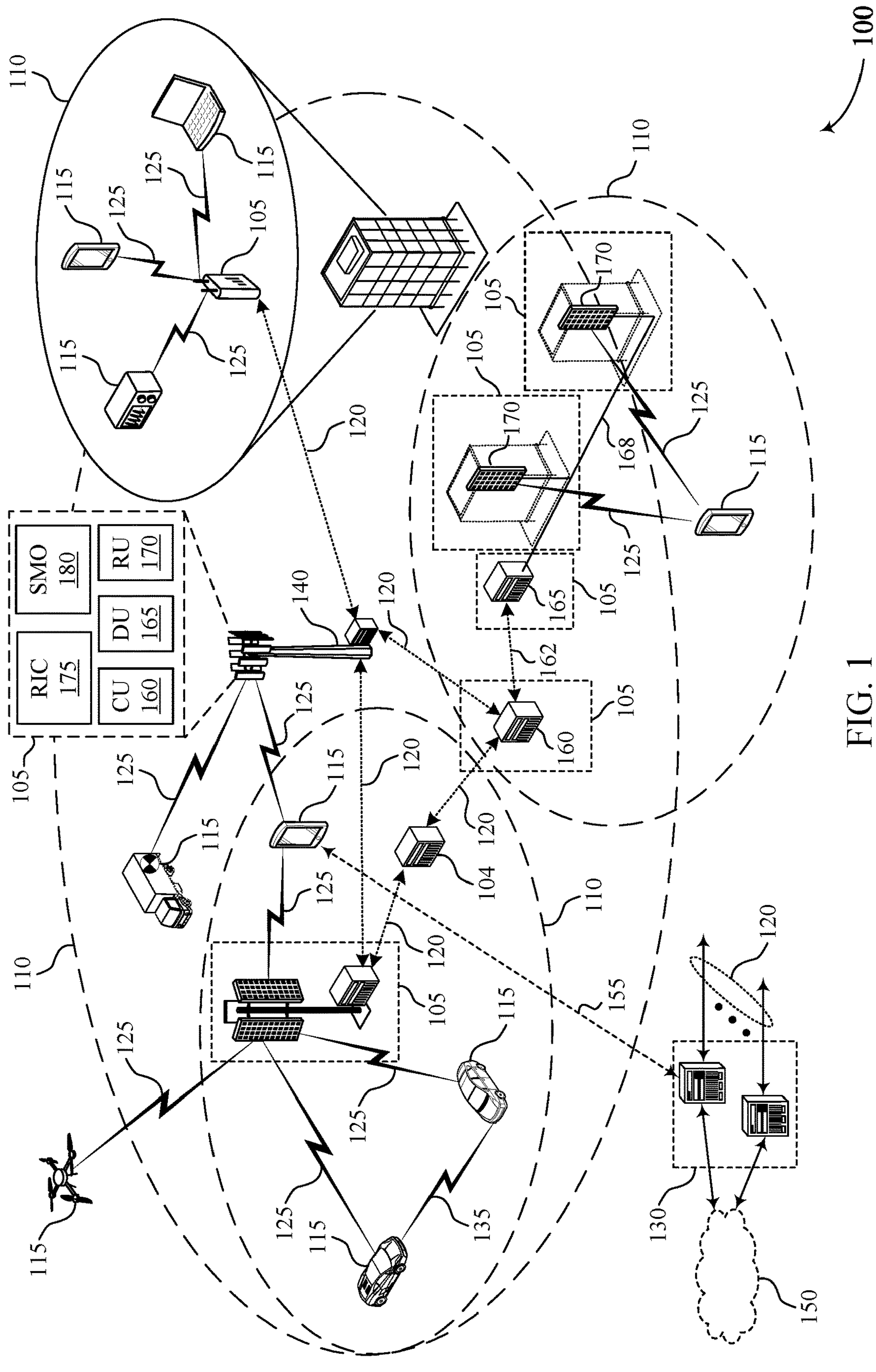
FIG. 1 illustrates an example of a wireless communications system that supports transmission of deferred feedback via uplink shared channel in accordance with aspects of the present disclosure.

In wireless communications systems, a UE may be configured with periodic resources for receiving semi-persistent scheduled downlink transmissions. According to a first type of transmission time interval format, the UE may receive a semi-persistent scheduled downlink transmission and may transmit feedback on one or more uplink symbols after receiving the semi-persistent scheduled downlink transmission. In some examples, a network entity may transmit an indication to change the transmission time interval format. Upon receiving the indication to change the transmission time interval format, the UE may identify a conflict between a symbol period allocated for feedback transmission for a semi-persistent scheduled downlink transmission and for downlink reception. In some examples, a first transmission time interval format may support a first number of downlink symbols, flexible symbols and uplink symbols, and a second transmission time interval format may support a second number of downlink symbols, flexible symbols and uplink symbols.

If the UE receives an indication to switch from the first transmission time interval format to the second transmission time interval format, the UE may determine that the symbol used for feedback transmission in the first transmission time interval format changes to a downlink symbol in the second transmission time interval format. In some examples, the UE may defer the feedback transmission due to the conflict resulting from the transmission time interval format change and may utilize a first available control channel in the second transmission time interval format for transmitting the deferred feedback. However, the first available control channel may have insufficient resources for multiple UEs, simultaneously utilizing the control channel for deferred feedback transmission (e.g., first available uplink subslot may be overloaded with uplink traffic from multiple UEs in two uplink symbols). In addition, transmission of deferred feedback from one UE may conflict with transmission of data from another UE.

One or more aspects of the present disclosure provide for a method to transmit feedback if the UE identifies a conflict between a symbol period allocated for feedback transmission for a semi-persistent scheduled downlink transmission and for downlink reception due to a transmission time interval format change. In particular, according to aspects depicted herein, a UE may defer the feedback transmission until an uplink shared channel resource instead of transmitting in the first available control channel (in which multiple UEs potentially may all be attempting to send feedback data caused by the changed format of the transmission time interval). In some examples, the UE may identify a conflict for a symbol period between uplink transmission of feedback for a first semi-persistent scheduled downlink transmission and downlink reception based on the change to the transmission time interval format. The UE may then transmit, in an uplink shared channel resource of the transmission time interval format that differs from the symbol period, an uplink message including uplink data multiplexed with the feedback based on the conflict. That is, in an uplink shared channel resource of a transmission time interval format, the UE may multiplex the deferred feedback with uplink data. According to one or more aspects, the UE may transmit an uplink message (during a physical uplink shared channel) including uplink data multiplexed with the deferred feedback.

Particular aspects of the subject matter described herein may be implemented to realize one or more advantages. The described techniques may support improvements in feedback transmission in wireless communications systems by increasing coverage and reducing signaling overhead. Further, in some examples, the feedback transmission configuration as described herein may support higher data rates and diversity for control and data, thereby improving latency and reliability. As such, supported techniques may include improved network operations, and, in some examples, may promote network efficiencies, among other benefits.

Aspects of the disclosure are initially described in the context of wireless communications systems. Aspects of the disclosure are further illustrated by and described with reference to feedback transmission procedures and process flow. Aspects of the disclosure are further illustrated by and described with reference to apparatus diagrams, system diagrams, and flowcharts that relate to transmission of deferred feedback via uplink shared channel.

FIG. 1 illustrates an example of a wireless communications system 100 that supports transmission of deferred feedback via uplink shared channel in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support transmission of deferred feedback via uplink shared channel as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

According to one or more aspects, a UE 115 may receive, from a network entity 105, control signaling configuring periodic resources for receiving semi-persistent scheduled downlink transmissions. The UE 115 may receive a respective semi-persistent scheduled downlink transmission of the semi-persistent scheduled downlink transmissions via the periodic resources based on the control signaling. The UE 115 may then receive a control message indicating a change to a transmission time interval format. In some examples, the UE 115 may identify a conflict for a symbol period between uplink transmission of feedback for a first semi-persistent scheduled downlink transmission and downlink reception based on the change to the transmission time interval format. The UE 115 may then transmit, in an uplink shared channel resource of the transmission time interval format that differs from the symbol period, an uplink message comprising uplink data multiplexed with the feedback based on the conflict.

Figure 2:
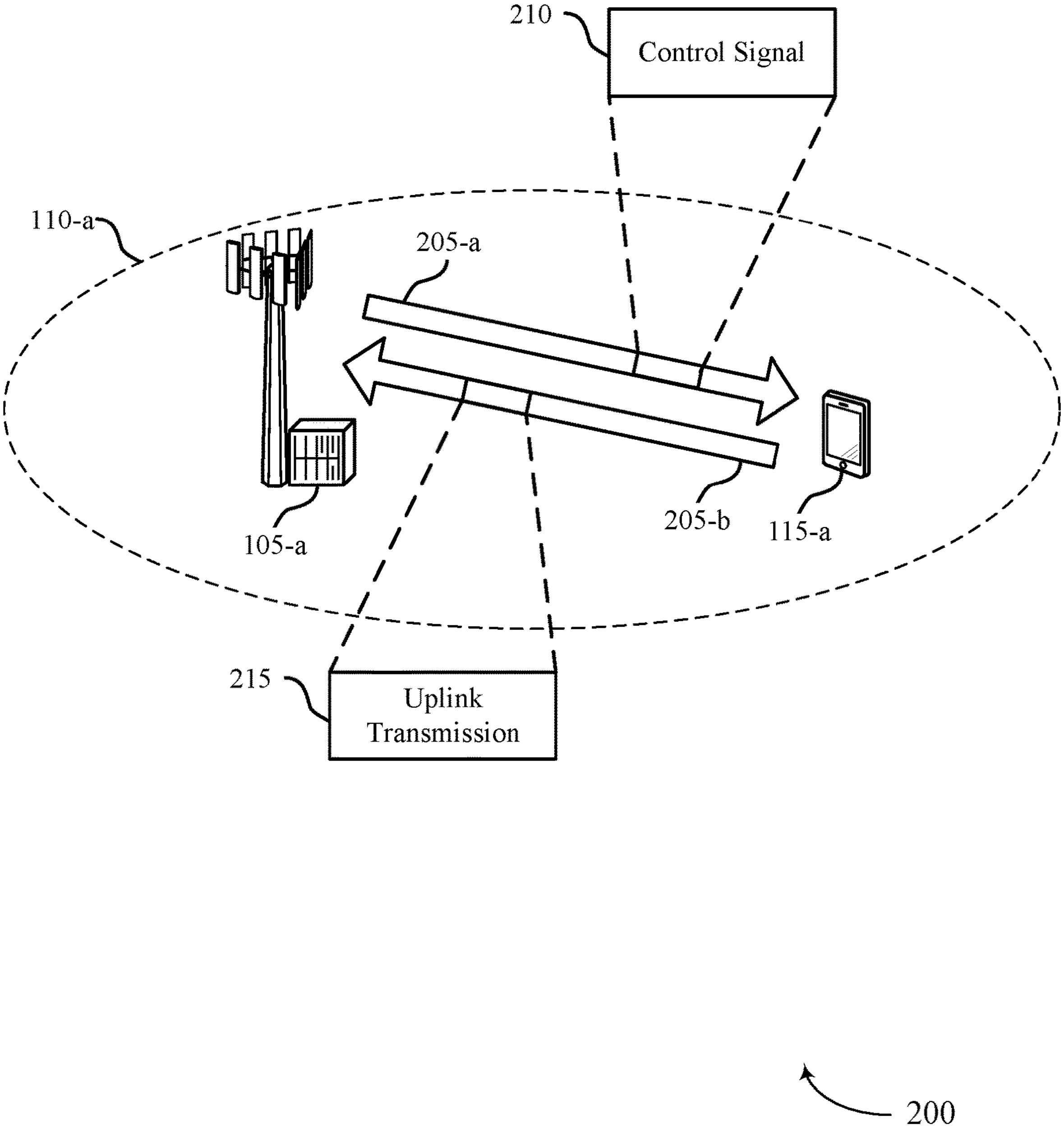
FIG. 2 illustrates an example of a wireless communications system that supports transmission of deferred feedback via uplink shared channel in accordance with aspects of the present disclosure.

FIG. 2 illustrates an example of a wireless communications system 200 that supports transmission of deferred feedback via uplink shared channel in accordance with aspects of the present disclosure. In some examples, the wireless communications system 200 may implement or be implemented by aspects of the wireless communications system 100. For example, the wireless communications system 200 may include a UE 115-*a* and a network entity 105-*a*, which may be examples of a UE 115 and a network entity 105 as described with reference to FIG. 1.

The UE 115-*a* may communicate with the network entity 105-*a* in a geographic coverage area 110-*a* supported by the network entity 105-*a*. The geographic coverage area 110-*a* which may be an example of a geographic coverage area 110 as described with reference to FIG. 1. As depicted in the example of FIG. 1, the network entity 105-*a* may transmit one or more downlink signals to the UE 115-*a* via a communications link 205-*a* (e.g., a downlink communications link) and the UE 115-*a* may transmit one or more uplink signals to the network entity 105-*a* via a communications link 205-*b* (e.g., an uplink communications link). In some cases, the UE 115-*a* may be configured by the network entity 105-*a* to transmit feedback to the network entity 105-*a* using a deferred feedback transmission scheme. In some cases, the network entity 105-*a* may transmit a control signal configuring resources for receiving downlink transmissions via the communications link 205-*a*. In some examples, the control signal may include at least one of an RRC signal, a downlink control information or a MAC control element. Additionally or alternatively, the network entity 105-*a* may transmit a set of downlink transmissions via the communications link 205-*a*, where the downlink transmissions may include semi-persistent scheduled downlink transmissions. In response to receiving the control signal and the downlink transmissions, the UE 115-*a* may transmit an uplink transmission 215 (e.g., uplink data multiplexed with a deferred feedback) to the network entity 105-*a*. In some case, the uplink transmission 215 may contain embedded feedback information (e.g., acknowledgement or negative acknowledgement (ACK/NACK) feedback) for the semi-persistent scheduled downlink transmissions received by the UE 115-*a*. For example, the UE 115-*a* may multiplex one or more feedback bits for one or more semi-persistent scheduled downlink transmissions received by the UE 115-*a* with one or more bits of uplink data scheduled for transmission in a physical uplink shared channel by a grant. In one example, the UE 115-*a* may append the one or more feedback bits (e.g., semi-persistent scheduling ACK/NACK information) to the one or more bits of uplink data.

In some wireless communications systems, a UE may be configured with (via a control message transmitted from the network entity) periodic resources for receiving semi-persistent scheduled downlink transmissions. According to a first type of slot format (e.g., a transmission time interval format), the UE may transmit feedback on one or more uplink symbols after receiving the semi-persistent scheduled downlink transmission. A network entity may transmit an indication (via a control message) to change the slot format. In some cases, the UE may identify a conflict between a symbol period allocated for feedback transmission for a semi-persistent scheduled downlink transmission and for downlink reception based on the change to the slot format. For example, a slot format 42 may support 3 downlink symbols, 3 flexible symbols and 8 uplink symbols, and a slot format 33 may support 9 downlink symbols, 3 flexible symbols and 2 uplink symbols. If the UE receives an indication to switch from slot format 42 to slot format 33, the UE may determine that the symbol allocated for feedback transmission in slot format 42 is a downlink symbol in slot format 33. In some examples, the UE may defer the feedback transmission (e.g., semi-persistent scheduling ACK/NACK information) and may utilize a first available control channel for transmitting the deferred feedback. However, multiple UEs, simultaneously utilizing the control channel for deferred feedback transmission may cause overload at the network entity. In addition, transmission of deferred feedback (e.g., semi-persistent scheduling ACK/NACK information) from one UE may conflict with transmission of data from another UE. In some examples, a cell may include 20 UEs. Out of the 20 UEs, 10 UEs may be affected (e.g., identify a conflict on a symbol period) and each UE of the 10 UEs may need to defer to a first available physical uplink control channel. Additionally, all 20 UEs may have uplink traffic and active configured grant and/or physical uplink shared channel. Thus, the network entity may be overloaded and may be unable to efficiently process uplink transmissions (deferred feedback and/or uplink data) from all 20 UEs.

In some examples, a physical uplink shared channel allocation to a first UE may conflict with a deferred feedback transmission (e.g., semi-persistent scheduling ACK/NACK information) from a second UE. The first UE may receive a downlink control information (e.g., DCI 0_1) at time to that provides a physical uplink shared channel allocation for the first UE via uplink beam 5 and physical resource blocks 10 through 22. At time t1 (later than time t0), a second UE may receive a respective semi-persistent scheduled downlink transmission of the semi-persistent scheduled downlink transmissions via the periodic resources. The second UE may determine a format change to the transmission time interval and may subsequently determine a conflict for a symbol period between uplink transmission of feedback for a first semi-persistent scheduled downlink transmission and downlink reception. In such scenarios, the second UE may defer the feedback transmission (e.g., semi-persistent scheduling ACK/NACK information) to a first available uplink control channel. In some examples, the first available uplink control channel may use uplink beam 5 and physical resource blocks 11 and 12 (corresponding to a physical uplink control channel resource identifier 1). The second UE may choose physical uplink control channel resource identifier 1 without being aware of the first UE is being scheduled at the same resource. As a result, both UEs may transmit on overlapping physical resource blocks and using same uplink beams. The network entity may not be aware of subsequent feedback deferral at the second UE and may be unable to process overlapping transmission (uplink transmission by the first UE and deferred feedback transmission by the second UE).

Aspects of the present disclosure provide for a technique to transmit feedback if the UE identifies a conflict between a symbol period allocated for feedback transmission for a semi-persistent scheduled downlink transmission and for downlink reception due to a change in a transmission time interval format. In particular, aspects depicted herein provides for a UE to defer the feedback transmission until an uplink shared channel resource instead of transmitting in the first available control channel (in which multiple UEs potentially may all be attempting to send feedback data in caused by the changed format). In an uplink shared channel resource of a slot format, the UE may multiplex the deferred feedback with uplink data. That is, the UE may transmit an uplink message (during a physical uplink shared channel) including uplink data multiplexed with the deferred feedback.

According to aspects depicted herein, the UE 115-*a* may receive control signaling 210 configuring periodic resources for receiving semi-persistent scheduled downlink transmissions. The UE 115-*a* may then receive a control message indicating a change to a transmission time interval format. In some examples, the control message may include at least one of an RRC signal, a downlink control information or a MAC control element. For example, the UE 115-*a* may identify a slot format change according to an RRC configuration (e.g. the pattern defined in information element SlotFormatCombinationsPerCell). The UE 115-*a* may identify a semi-persistent scheduled physical uplink control channel according to physical uplink control channel Format 0 (1 bit), and may determine that the first uplink physical uplink control channel resource corresponds to first available uplink symbol.

The UE 115-*a* may identify a conflict for a symbol period between uplink transmission of feedback (e.g., semi-persistent scheduling ACK/NACK information) for a first semi-persistent scheduled downlink transmission and downlink reception based on the change to the transmission time interval format (e.g., slot format). In some examples, the UE 115-*a* may identify one or more characteristics for uplink traffic. For example, the UE 115-*a* may identify a downlink control information formation (DCI 0_1) prior to semi-persistent scheduled physical uplink control channel collision with downlink symbols and may identify uplink allocation without consideration of deferred feedback bits. In some examples, the UE 115-*a* may receive a physical uplink shared channel allocation (e.g., DCI 0_1) prior to the format change of the transmission time interval (e.g., slot) and prior to the semi-persistent physical uplink control channel collision with downlink transmissions with a consideration of deferred feedback (e.g., semi-persistent scheduled HARQ or industrial internet of things HARQ or ultra-reliable low-latency communication HARQ) bits. The UE 115-*a* may multiplex (append) deferred semi-persistent scheduled physical uplink control channel feedback bits to physical uplink shared channel. That is, the UE 115-*a* may transmit, in an uplink shared channel resource of the transmission time interval format that differs from the symbol period, an uplink message including uplink data multiplexed with the feedback based on the conflict.

According to one or more aspects, transmission of deferred feedback bits (e.g., semi-persistent scheduling ACK/NACK information) via physical uplink shared channel after format change may be based on a number of factors described herein. For example, the UE 115-*a* may receive a grant indicating the uplink shared channel resource that occurs after an uplink control channel resource of the transmission time interval format (e.g., slot). The UE 115-*a* may receive a respective semi-persistent scheduled downlink transmission of the semi-persistent scheduled downlink transmissions via the periodic resources based on the control signaling 210.

In a first example, if an uplink allocation is sufficient for physical uplink shared channel and for deferred feedback bits and the physical uplink shared channel transmission starts before a deferral instant (e.g., feedback deferral window), then the UE 115-*a* transmits deferred feedback bits via physical uplink shared channel (irrespective of the relative time of physical uplink shared channel and of deferred feedback). For example, upon reception of a downlink control information (e.g., DCI 0_1) at the UE 115-*a*, the UE 115-*a* may be aware that the UE 115-*a* may defer semi-persistent scheduled physical uplink control channel feedback. Additionally or alternatively, if an uplink allocation is not sufficient for physical uplink shared channel and for deferred feedback bits and the physical uplink shared channel transmission starts before a deferral instant (e.g., feedback deferral window), then the UE 115-*a* may drop the deferred feedback bits and may transmit the physical uplink shared channel. In some examples, the network entity 105-*a* may transmit an indication configuring the UE 115-*a* to drop deferred feedback corresponding to a semi-persistent scheduled downlink transmission.

In some examples, if an uplink allocation (e.g., physical uplink shared channel allocation) is after a deferral instant (e.g., feedback deferral window), then the UE 115-*a* may defer to the first available physical uplink control channel for feedback transmission. In some examples, the network entity 105-*a* may indirectly indicate that the UE 115-*a* can handle the deferral on its own. In such cases, the amount of uplink resources allocated may not play any role in transmission of deferred feedback. In some examples, if an uplink allocation (e.g., physical uplink shared channel allocation) is after a deferral instant (e.g., feedback deferral window), then the UE 115-*a* may drop the deferred feedback bits. In some examples, the network entity 105-*a* may indirectly indicate that there is no need for deferred feedback bit transmission. In some examples, the amount of uplink resources allocated may not play a role in in dropping of the deferred feedback. Thus, the UE 115-*a* may determine to transmit or drop the deferred feedback based on uplink resources being sufficient or insufficient for physical uplink shared channel and deferred feedback bits. Additionally or alternatively, the UE 115-*a* may determine to transmit or drop the deferred feedback based on a physical uplink shared channel transmission instant being before or after a deferral instant or the physical uplink shared channel transmission instant being before or at the same instant as a first available physical uplink control channel resource.

According to one or more aspects, the UE 115-*a* may receive a grant indicating the uplink shared channel resource that occurs after an uplink control channel resource of the transmission time interval format and prior to an end of a feedback deferral time window associated with providing the feedback for the first semi-persistent scheduled downlink transmission. The UE 115-*a* may transmit the uplink message including the uplink data multiplexed with the feedback based on an allocated size of the uplink shared channel resource being sufficient to transport the uplink message.

In some examples, the UE 115-*a* may receive a grant via communication link 205-*a* and may determine that the allocated size of the uplink shared channel resource is sufficient for transmission of physical uplink shared channel and deferred feedback bits.

In such cases, the physical uplink shared channel instant may be at the same time instant as the first available physical uplink control channel. The UE 115-*a* may transmit the feedback bits via the physical uplink shared channel. In some examples, the UE 115-*a* may receive a grant via communication link 205-*a* and may determine that the allocated size of the uplink shared channel resource is sufficient for transmission of physical uplink shared channel and deferred feedback bits. In such cases, the physical uplink shared channel instant may be after the first available physical uplink control channel and the physical uplink shared channel transmission instant may be prior to a feedback deferral window. In such cases, UE 115-*a* may transmit the feedback bits via the physical uplink shared channel. Thus, the UE 115-*a* may transmit the uplink message in the uplink shared channel resource that occurs after an uplink control channel resource.

According to one or more aspects, the UE 115-*a* may receive a grant indicating the uplink shared channel resource that occurs after an uplink control channel resource of the transmission time interval format and after a feedback deferral time window associated with providing a deferred feedback. In such cases, the UE 115-*a* may transmit the deferred feedback in the uplink control channel resource. For example, the UE 115-*a* may receive a grant via communication link 205-*a* and may determine that the allocated size of the uplink shared channel resource is sufficient for transmission of physical uplink shared channel and deferred feedback bits. In such cases, the physical uplink shared channel instant may be after the first available physical uplink control channel and the physical uplink shared channel transmission instant may be after a feedback deferral window. The UE 115-*a* may transmit the feedback bits via the first available physical uplink control channel. In some examples, the UE 115-*a* may receive a grant via communication link 205-*a* and may determine that the allocated size of the uplink shared channel resource is not sufficient for transmission of physical uplink shared channel and deferred feedback bits. In such cases, the physical uplink shared channel instant may be at the same time instant as the first available physical uplink control channel. In such cases, the UE 115-*a* may drop the deferred feedback bits. For example, the UE 115-*a* may drop a deferred feedback corresponding to a prior semi-persistent scheduled downlink transmission based on an allocated size of an uplink shared channel resource being insufficient to transport the deferred feedback in an uplink message.

According to some examples, the UE 115-*a* may receive a grant via communication link 205-*a* and may determine that the allocated size of the uplink shared channel resource is not sufficient for transmission of physical uplink shared channel and deferred feedback bits. In such cases, the physical uplink shared channel instant may be after the first available physical uplink control channel and the physical uplink shared channel instant may be prior to a deferral instant (e.g., feedback deferral window). In such cases, the UE 115-*a* may drop the deferred feedback bits. Additionally or alternatively, the UE 115-*a* may receive a grant via communication link 205-*a* and may determine that the allocated size of the uplink shared channel resource is not sufficient for transmission of physical uplink shared channel and deferred feedback bits. In such cases, the physical uplink shared channel instant may be after the first available physical uplink control channel and the physical uplink shared channel instant may be after to a deferral instant (e.g., feedback deferral window). In such cases, the UE 115-*a* may transmit the deferred feedback bits via the first available physical uplink control channel. The techniques depicted herein may be applied to all deferred feedback bits up to the time instant of a downlink control information transmission.

The UE 115-*a*, in some examples, may receive second control signaling indicating a configured grant resource. The UE 115-*a* may transmit an uplink message in the uplink shared channel resource within the configured grant resource. For example, if a configured grant physical uplink shared channel includes sufficient resources for deferred feedback bits, then, the UE 115-*a* may multiplex (e.g., append) the deferred feedback bits with a configured grant transmission in the configured grant physical uplink shared channel. In some examples, the UE 115-*a* may identify a transmission time interval format change resulting in conflict on a symbol period. The UE 115-*a* may also determine a feedback deferred from a prior time instant (due to the conflict). The UE 115-*a*, in some examples, may determine that there is a configured grant resource (based on the second control signaling) within a feedback deferral window. In such cases, the UE 115-*a* may multiplex the feedback with the transmission on the configured grant resource. In an example where other uplink control information content is multiplexed with a configured grant physical uplink shared channel, the UE 115-*a* may transmit the uplink message on the configured grant physical uplink shared channel. In the uplink message, new feedback bits may be prioritized over deferred feedback bits, deferred feedback bits may be prioritized over a scheduling request, and the scheduling request may be prioritized over a channel state information.

In some examples, transmitting the uplink message may include the uplink data that is multiplexed with the feedback, the uplink data including a scheduling request, channel state information, or both. The feedback may be associated with a most recent (e.g., a most recently received) semi-persistent scheduled downlink transmission of the semi-persistent scheduled downlink transmissions that is prioritized relative to deferred feedback for an earlier semi-persistent scheduled downlink transmission of the semi-persistent scheduled downlink transmissions. Additionally or alternatively, the feedback may be prioritized over scheduling request and channel state information. Thus, the UE 115-*a* may apply the techniques depicted herein to efficiently transit deferred feedback in cases of a format change of a transmission time interval (e.g., slot format change).

Figure 3:
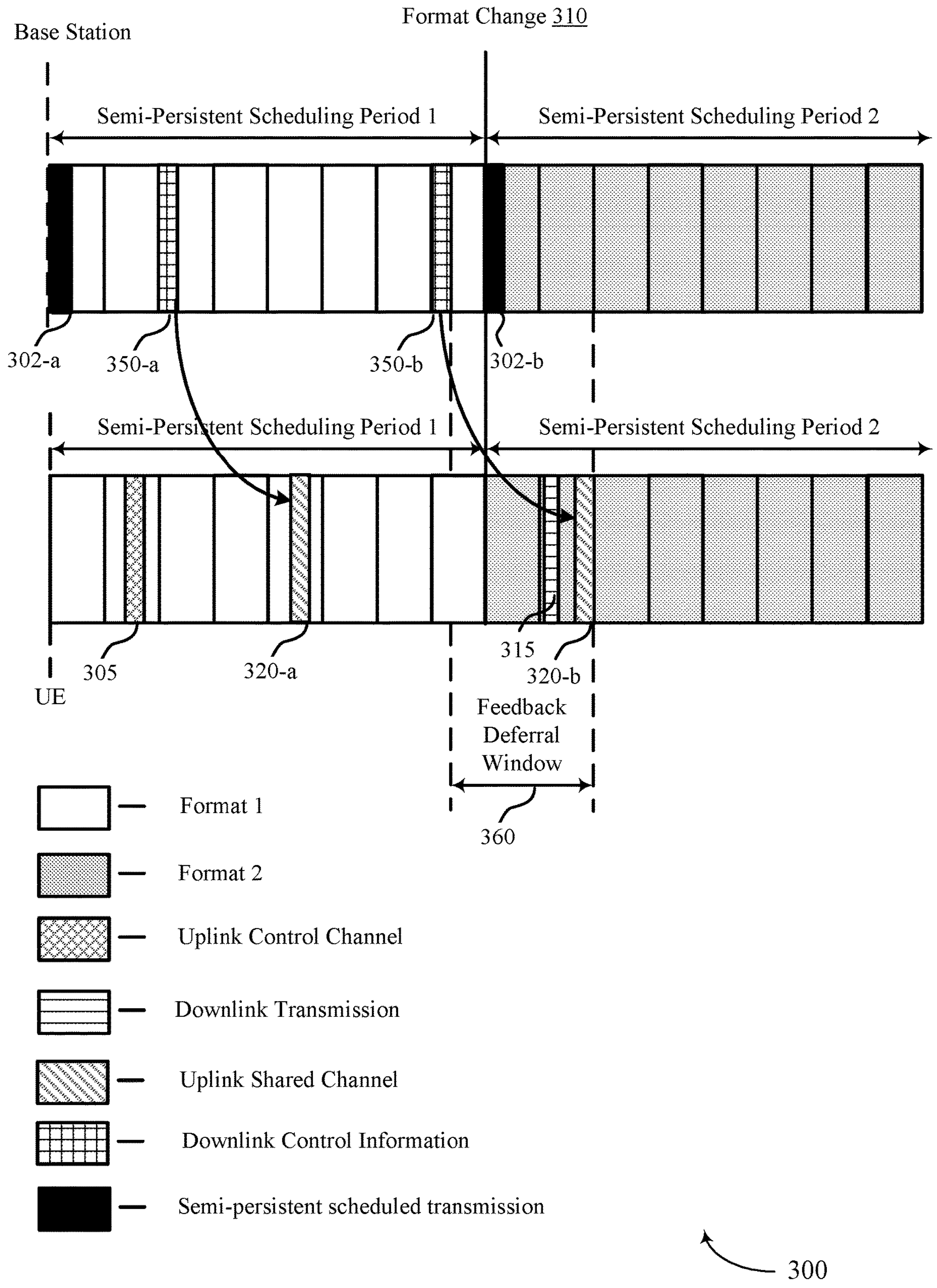
FIG. 3 illustrates an example of a feedback transmission procedure that supports transmission of deferred feedback via uplink shared channel in accordance with aspects of the present disclosure.

FIG. 3 illustrates an example of a feedback transmission procedure 300 that supports transmission of deferred feedback via uplink shared channel in accordance with aspects of the present disclosure. In some examples, the feedback transmission procedure 300 may implement aspects of wireless communications system 100 and the wireless communications system 200 as depicted with reference to FIGS. 1 and 2. In some examples, the feedback transmission procedure 300 may be implement by a network entity 105 and one or more UEs 115. The network entity 105 and the UE 115 may be examples of a network entity 105 and a UE 115, as described with reference to FIGS. 1 and 2.

According to one or more aspects of the present disclosure, a UE 115 may receive control signaling configuring periodic resources for receiving semi-persistent scheduled downlink transmissions. As depicted herein, the UE 115 and the network entity 105 may be configured to perform transmissions according to semi-persistent scheduling period 1 and semi-persistent scheduling period 2. As depicted herein, the semi-persistent scheduling period 1 may operate according to a first transmission time interval format (format 1) and the semi-persistent scheduling period 2 may operate according to a second transmission time interval format (format 2). In the depicted example, an SPS Period may have a time duration of 1 millisecond that includes 112 symbols. The SPS period may include 8 slots each of 125 microseconds, where each slot includes 14 symbols. The UE 115 may receive a semi-persistent downlink transmission at the beginning of the semi-persistent scheduling period 1 and may provide a feedback at the uplink control channel instant 305 (e.g., 20 symbols later corresponding to a K1 value). For example, the network entity 105 may transmit a semi-persistent downlink transmission 302-*a* at the first slot of the semi-persistent scheduling period 1. As depicted herein, the format 1 may be an example of a slot format 42 that supports 3 downlink symbols, 3 flexible symbols and 8 uplink symbols.

The UE 115 operating according to the format 1 may transmit the feedback utilizing one of the 8 uplink symbols (used for uplink control channel transmission). In the example of FIG. 3, the UE transmits a feedback (e.g., SPS HARQ ACK or NACK) using a physical uplink control channel instant 305 of an uplink control channel. The network entity 105 may transmit a grant (e.g., downlink control information 350-*a*) scheduling an uplink shared channel resource (belonging to uplink shared channel). The UE 115 may transmit an uplink message during the uplink shared channel instant 320-*a* scheduled by the downlink control information 350-*a*. In some examples, the uplink shared channel instant 320-*a* may be K1 symbols after the downlink control information 350-*a*. The UE 115 may also receive a second grant (e.g., downlink control information 350-*b* or DCI 0_1) scheduling an uplink shared channel resource (belonging to uplink shared channel). For example, the downlink control information 350-*b* may schedule an uplink shared channel instant 320-*b*. The UE 115 may receive the downlink control information 350-*b* prior to a semi-persistent scheduling physical uplink control channel collision with downlink transmission without a consideration of deferred feedback bits.

The UE 115 may then receive a control message indicating a change to a transmission time interval format. As depicted in the example of FIG. 3, at 310, the UE 115 may receive a format change indication. The UE 115 may be configured to change to format 2. In some examples, the format 2 may be an example of a slot format 33 that supports 9 downlink symbols, 3 flexible symbols and 2 uplink symbols. As depicted in the example of FIG. 3, the UE 115 may receive a semi-persistent downlink transmission at the beginning of the semi-persistent scheduling period 2. For example, the network entity 105 may transmit a semi-persistent downlink transmission 302-*b* at the first slot of the semi-persistent scheduling period 2. The UE 115 may determine that there is a conflict for a symbol period 315 between uplink transmission of feedback for a first semi-persistent scheduled downlink transmission (e.g., SPS HARQ ACK or NACK) and downlink reception based on the change to the transmission time interval format. As depicted in the example of FIG. 3, the UE 115 may determine that the symbol period 315 is a downlink channel symbol period (e.g., configured for downlink transmission) in the second transmission time interval format, where a corresponding symbol period in the first transmission time interval format was an uplink symbol period. The UE 115 may thus determine that there is a conflict in symbol period 315 between the transmission of a feedback for the semi-persistent scheduled downlink transmission 302-*b* and the downlink reception due to symbol period 315 being a downlink symbol period in the second transmission time interval format.

Rather than transmission of feedback for the semi-persistent scheduled downlink transmission 302-*b* in symbol period 315, the UE 115 may instead transmit, in an uplink shared channel resource that differs from the symbol period, an uplink message including uplink data multiplexed with the feedback based on the conflict. As depicted in the example of FIG. 3, in the semi-persistent scheduling period 2, the UE 115 may defer the feedback and may transmit the deferred feedback in a physical uplink shared channel 320-*b* of the uplink shared channel.

According to one or more aspects, the UE 115 may receive a grant (e.g., downlink control information 350-*b*) and may determine that the allocated size of the uplink shared channel resource 320-*b* is sufficient for transmission of physical uplink shared channel and deferred feedback bits. In such cases, the physical uplink shared channel resource 320-*b* may be at the same time instant as the first available physical uplink control channel (not shown). In some examples, the UE 115 may transmit the feedback bits via the uplink shared channel. Alternatively, the physical uplink shared channel instant 320-*b* may be after the first available physical uplink control channel and the physical uplink shared channel transmission instant 320-*b* may be prior to a feedback deferral window 360. As shown herein, the feedback deferral window may be a maximum feedback deferral window. In such cases, UE 115 may transmit the feedback bits via the physical uplink shared channel instant 320-*b*. In some examples, the UE 115-*a* may transmit the uplink message in the uplink shared channel resource (on physical uplink shared channel instant 320-*b*) that occurs after an uplink control channel resource.

Figure 4:
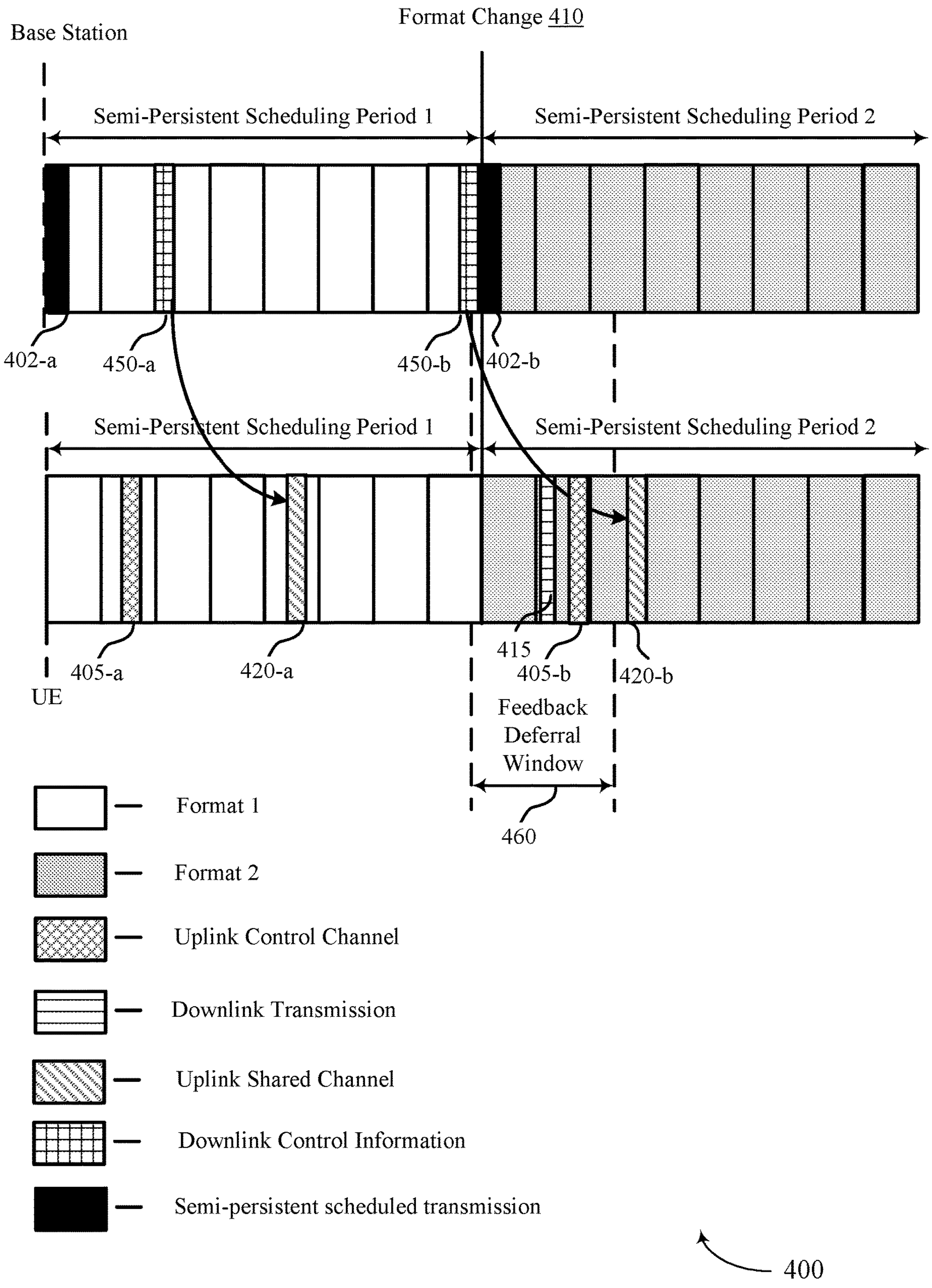
FIG. 4 illustrates an example of a feedback transmission procedure that supports transmission of deferred feedback via uplink shared channel in accordance with aspects of the present disclosure.

FIG. 4 illustrates an example of a feedback transmission procedure 400 that supports transmission of deferred feedback via uplink shared channel in accordance with aspects of the present disclosure. In some examples, the feedback transmission procedure 400 may implement aspects of wireless communications system 100 and the wireless communications system 200 as depicted with reference to FIGS. 1 and 2. In some examples, the feedback transmission procedure 400 may be implement by a network entity 105 and one or more UEs 115. The network entity 105 and the UE 115 may be examples of a network entity 105 and a UE 115, as described with reference to FIGS. 1 and 2.

According to one or more aspects of the present disclosure, a UE 115 may receive control signaling configuring periodic resources for receiving semi-persistent scheduled downlink transmissions. As depicted herein, the UE 115 and the network entity 105 may be configured to perform transmissions according to semi-persistent scheduling period 1 and semi-persistent scheduling period 2. As depicted herein, the semi-persistent scheduling period 1 may operate according to a first transmission time interval format (format 1) and the semi-persistent scheduling period 2 may operate according to a second transmission time interval format (format 2). The UE 115 may receive a semi-persistent downlink transmission at the beginning of the semi-persistent scheduling period 1 and may provide a feedback at the uplink control channel instant 405-*a* (e.g., SPS HARQ ACK or NACK). For example, the network entity 105 may transmit a semi-persistent downlink transmission 402-*a* at the first slot of the semi-persistent scheduling period 1. As depicted herein, the format 1 may be an example of a slot format 42 that supports 3 downlink symbols, 3 flexible symbols and 8 uplink symbols.

The UE 115 operating according to the format 1 may transmit the feedback utilizing one of the 8 uplink symbols (used for uplink control channel transmission). In the example of FIG. 4, the UE transmits a feedback using a physical uplink control channel instant 405-*a* of an uplink control channel. The network entity 105 may transmit a grant (e.g., downlink control information 450-*a*) scheduling an uplink shared channel resource (belonging to uplink shared channel). The UE 115 may transmit an uplink message during the uplink shared channel instant 420-*a* scheduled by the downlink control information 450-*a*. In some examples, the uplink shared channel instant 420-*a* may be K1 symbols after the downlink control information 450-*a*. The UE 115 may also receive a second grant (e.g., downlink control information 450-*b*) scheduling an uplink shared channel resource (belonging to uplink shared channel). For example, the downlink control information 450-*b* may schedule an uplink shared channel instant 420-*b*.

The UE 115 may then receive a control message indicating a change to a transmission time interval format. As depicted in the example of FIG. 4, at 410, the UE 115 may receive a format change indication. The UE 115 may be configured to change to format 2. In some examples, the format 2 may be an example of a slot format 33 that supports 9 downlink symbols, 3 flexible symbols and 2 uplink symbols. As depicted in the example of FIG. 4, the UE 115 may receive a semi-persistent downlink transmission at the beginning of the semi-persistent scheduling period 2. For example, the network entity 105 may transmit a semi-persistent downlink transmission 402-*b* at the first slot of the semi-persistent scheduling period 2. The UE 115 may determine that there is a conflict for a symbol period between uplink transmission of feedback for a first semi-persistent scheduled downlink transmission and downlink reception based on the change to the transmission time interval format. As depicted in the example of FIG. 4, the UE 115 may determine that the symbol period 415 is a downlink channel symbol period (e.g., configured for downlink transmission) in the second transmission time interval format, where a corresponding symbol period in the first transmission time interval format was an uplink symbol period. The UE 115 may thus determine that there is a conflict between the transmission of a feedback for the semi-persistent scheduled downlink transmission 402-*b* and downlink reception due to symbol period 415 being a downlink symbol period in the second transmission time interval format.

Rather than transmission of feedback for the semi-persistent scheduled downlink transmission 402-*b* in symbol period 415, the UE 115 may instead transmit, in an uplink shared channel resource that differs from the symbol period, an uplink message including uplink data multiplexed with the feedback based on the conflict. As depicted in the example of FIG. 4, in the semi-persistent scheduling period 2, the UE 115 may defer the feedback and may transmit the deferred feedback in a physical uplink control channel instant 405-*b* of the uplink control channel.

According to one or more aspects, the UE 115 may receive a grant (e.g., downlink control information 450-*b*) and may determine that the allocated size of the uplink shared channel resource is sufficient for transmission of physical uplink shared channel and deferred feedback bits. In such cases, a physical uplink shared channel instant 420-*b* (of the uplink shared channel) scheduled by the downlink control information 450-*b* may be after the first available physical uplink control channel instant 405-*b* (corresponding to uplink control channel). The physical uplink shared channel instant 420-*b* may also be after a feedback deferral window 460. As such, UE 115 may transmit the deferred feedback bits via the first available physical uplink control channel instant 405-*b* (e.g., a first available PUCCH) so that the feedback is transmitted prior to an end of the feedback deferral window 460.

In some examples, the UE 115 may receive a grant and may determine that the allocated size of the uplink shared channel resource 405-*b* is not sufficient for transmission of physical uplink shared channel and deferred feedback bits. In such cases, a physical uplink shared channel instant 420-*b* (corresponding to the uplink shared channel) may be after the first available physical uplink control channel instant 405-*b* (corresponding to uplink control channel). The physical uplink shared channel instant 420-*b* may also be after a feedback deferral window 460. In such an example, the UE 115 may transmit the deferred feedback bits via the first available physical uplink control channel instant 405-*b* (e.g., a first available PUCCH) so that the feedback is transmitted prior to an end of the feedback deferral window 460.

Figure 5:
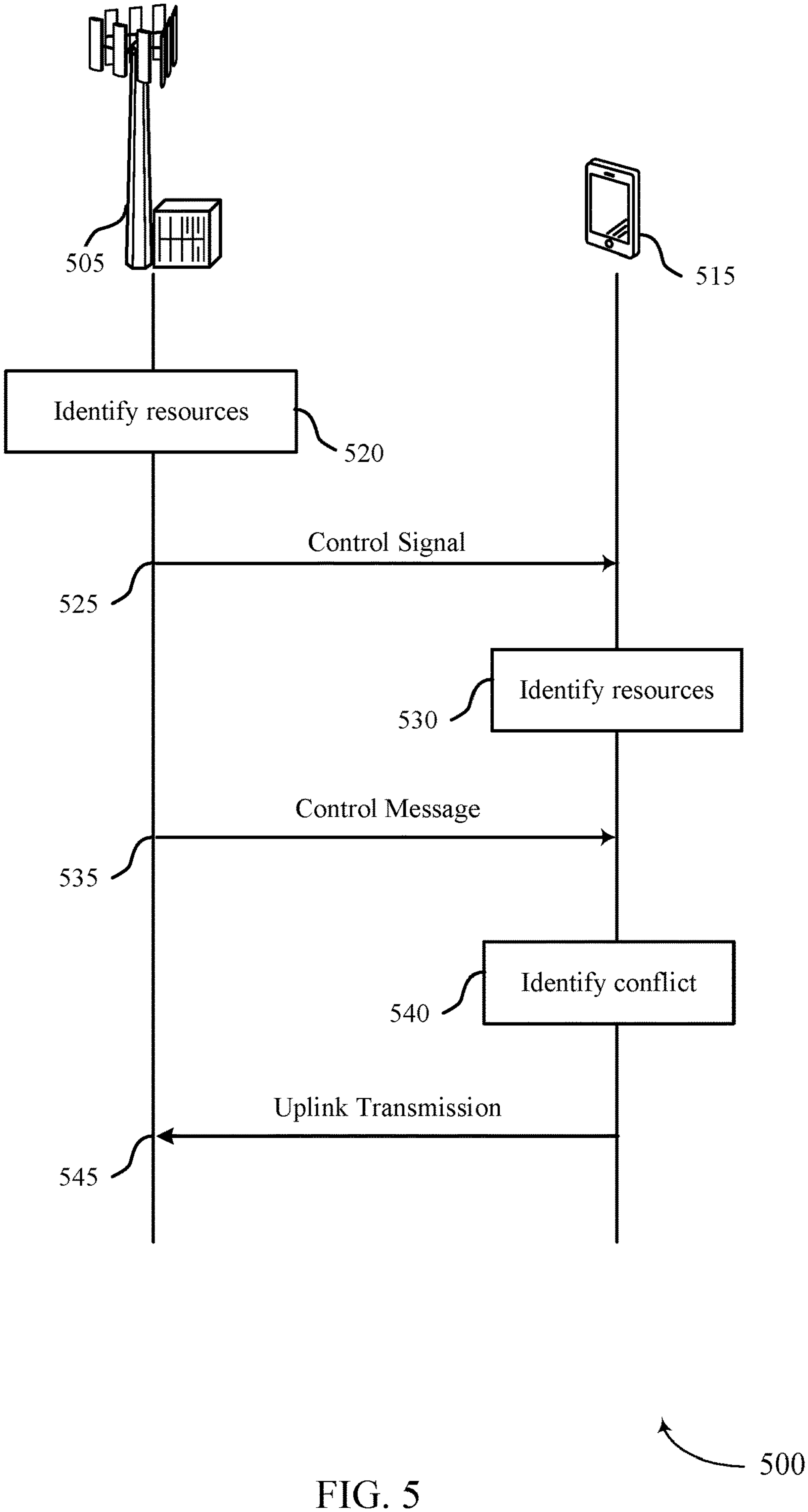
FIG. 5 illustrates an example of a process flow that supports transmission of deferred feedback via uplink shared channel in accordance with aspects of the present disclosure.

FIG. 5 illustrates an example of a process flow 500 that supports transmission of deferred feedback via uplink shared channel in accordance with aspects of the present disclosure. In some examples, the process flow 500 may implement aspects of wireless communications system 100 and the wireless communications system 200 described with reference to FIGS. 1 and 2, respectively. For example, the process flow 500 may be based on one or more rules for deferred feedback transmission in wireless communications systems. The process flow 500 may be implemented by the UE 515 and the network entity 505 for reduced power consumption, and may promote low latency and low interference for wireless communications supporting high priority channels, among other benefits. The network entity 505 and the UE 515 may be examples of a network entity 105 and a UE 115, as described with reference to FIGS. 1 and 2.

In the following description of the process flow 500, the operations between the network entity 505 and the UE 515 may be transmitted in a different order than the example order shown, or the operations performed by the network entity 505 and the UE 515 may be performed in different orders or at different times. Some operations may also be omitted from the process flow 500, and other operations may be added to the process flow 500.

At 520, the network entity 505 may identify periodic resources for transmitting semi-persistent scheduled downlink transmissions. At 525, the network entity 505 may transmit, to the UE 515, control signaling configuring periodic resources for receiving semi-persistent scheduled downlink transmissions. At 530, the UE 515 may identify the periodic resources upon receiving the control signaling. In some examples, the UE 515 may receive a respective semi-persistent scheduled downlink transmission of the semi-persistent scheduled downlink transmissions via the periodic resources based on the control signaling. The control signaling may be a MAC CE, DCI, RRC signaling, or the like.

At 535, the UE 515 may receive a control message indicating a change to a transmission time interval format.

At 540, the UE 515 may identify a conflict for a symbol period between uplink transmission of feedback for a first semi-persistent scheduled downlink transmission and downlink reception based on the change to the transmission time interval format. The control message may be a MAC CE, DCI, RRC signaling, or the like.

Although not shown in the example of FIG. 5, the UE 515 may receive a grant indicating an uplink shared channel resource that occurs after an uplink control channel resource of the transmission time interval format. Additionally or alternatively, the UE 515 may receive a grant indicating the uplink shared channel resource that occurs after an uplink control channel resource of the transmission time interval format and prior to an end of a feedback deferral time window associated with providing the feedback for the first semi-persistent scheduled downlink transmission.

At 545, the UE 515 may transmit, in an uplink shared channel resource of the transmission time interval format that differs from the symbol period, an uplink message including uplink data multiplexed with the feedback based on the conflict. In some examples, the UE 515 may transmit the uplink message including the uplink data multiplexed with the feedback (e.g., SPS HARQ ACK or NACK) based on an allocated size of the uplink shared channel resource being sufficient to transport the uplink message. In some examples, the UE 515 may transmit the uplink message in the uplink shared channel resource that occurs after an uplink control channel resource. In some examples, the feedback may include one or more bits and the uplink shared channel resource may include a scheduled uplink shared channel resource.

Figure 6:
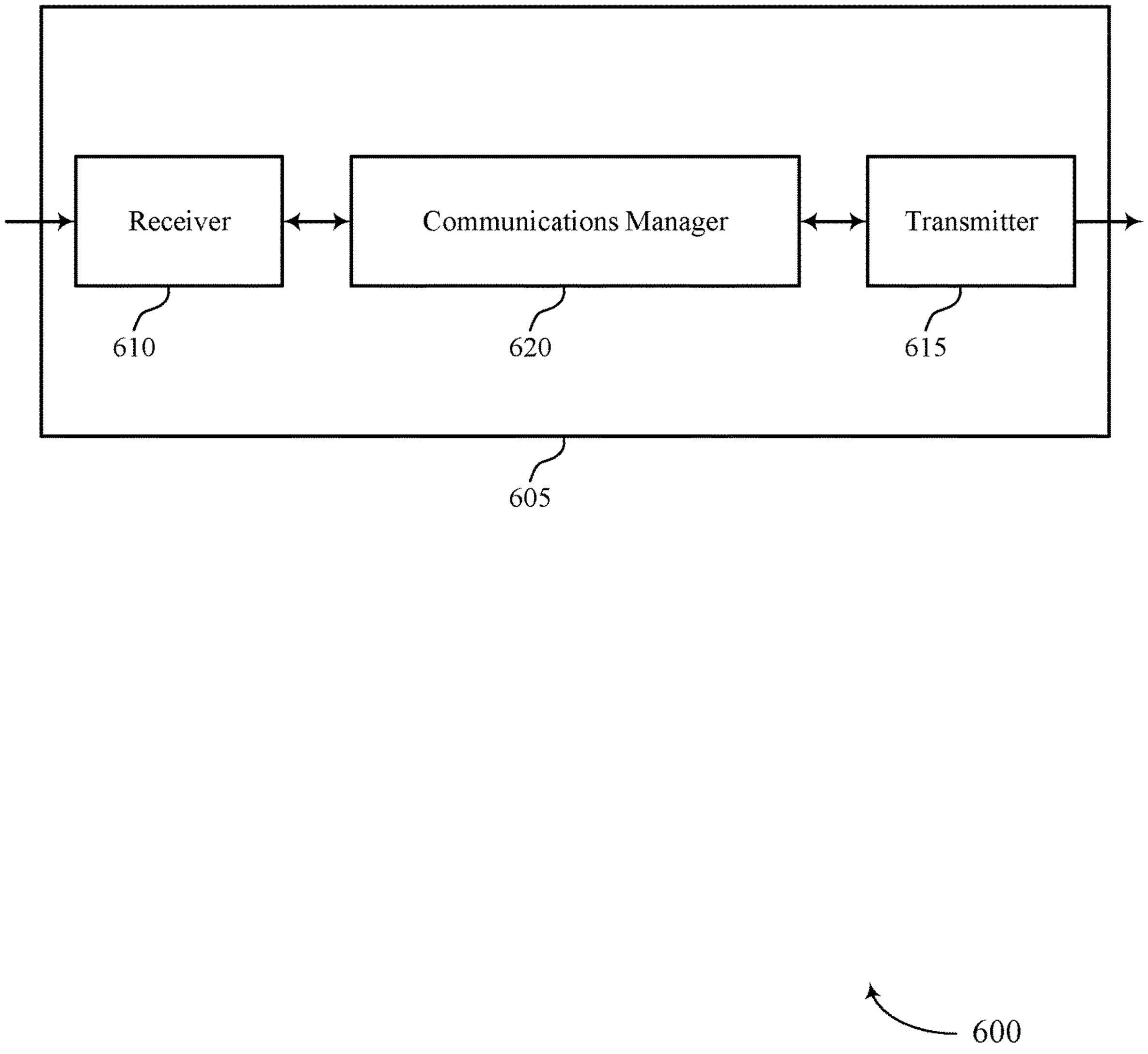
FIGS. 6 and 7 show block diagrams of devices that support transmission of deferred feedback via uplink shared channel in accordance with aspects of the present disclosure.

FIG. 6 shows a block diagram 600 of a device 605 that supports transmission of deferred feedback via uplink shared channel in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to transmission of deferred feedback). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to transmission of deferred feedback). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of transmission of deferred feedback as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving control signaling configuring periodic resources for receiving semi-persistent scheduled downlink transmissions. The communications manager 620 may be configured as or otherwise support a means for receiving a control message indicating a change to a transmission time interval format. The communications manager 620 may be configured as or otherwise support a means for identifying a conflict for a symbol period between uplink transmission of feedback for a first semi-persistent scheduled downlink transmission and downlink reception based on the change to the transmission time interval format. The communications manager 620 may be configured as or otherwise support a means for transmitting, in an uplink shared channel resource of the transmission time interval format that differs from the symbol period, an uplink message including uplink data multiplexed with the feedback based on the conflict.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing, reduced power consumption, and more efficient utilization of communication resources.

Figure 7:
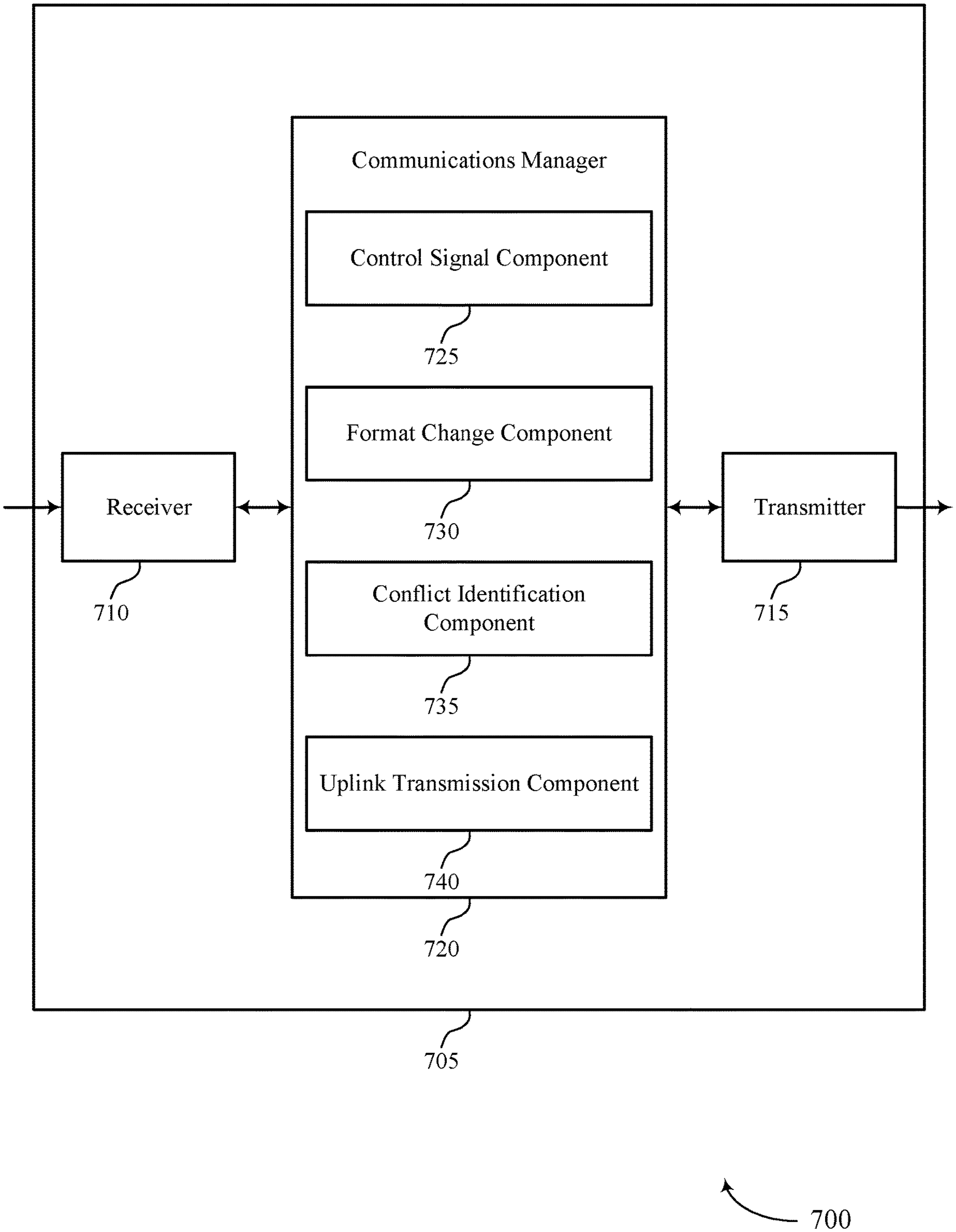

FIG. 7 shows a block diagram 700 of a device 705 that supports transmission of deferred feedback via uplink shared channel in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to transmission of deferred feedback). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to transmission of deferred feedback). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of transmission of deferred feedback as described herein. For example, the communications manager 720 may include a control signal component 725, a format change component 730, a conflict identification component 735, an uplink transmission component 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The control signal component 725 may be configured as or otherwise support a means for receiving control signaling configuring periodic resources for receiving semi-persistent scheduled downlink transmissions. The format change component 730 may be configured as or otherwise support a means for receiving a control message indicating a change to a transmission time interval format. The conflict identification component 735 may be configured as or otherwise support a means for identifying a conflict for a symbol period between uplink transmission of feedback for a first semi-persistent scheduled downlink transmission and downlink reception based on the change to the transmission time interval format. The uplink transmission component 740 may be configured as or otherwise support a means for transmitting, in an uplink shared channel resource of the transmission time interval format that differs from the symbol period, an uplink message including uplink data multiplexed with the feedback based on the conflict.

Figure 8:
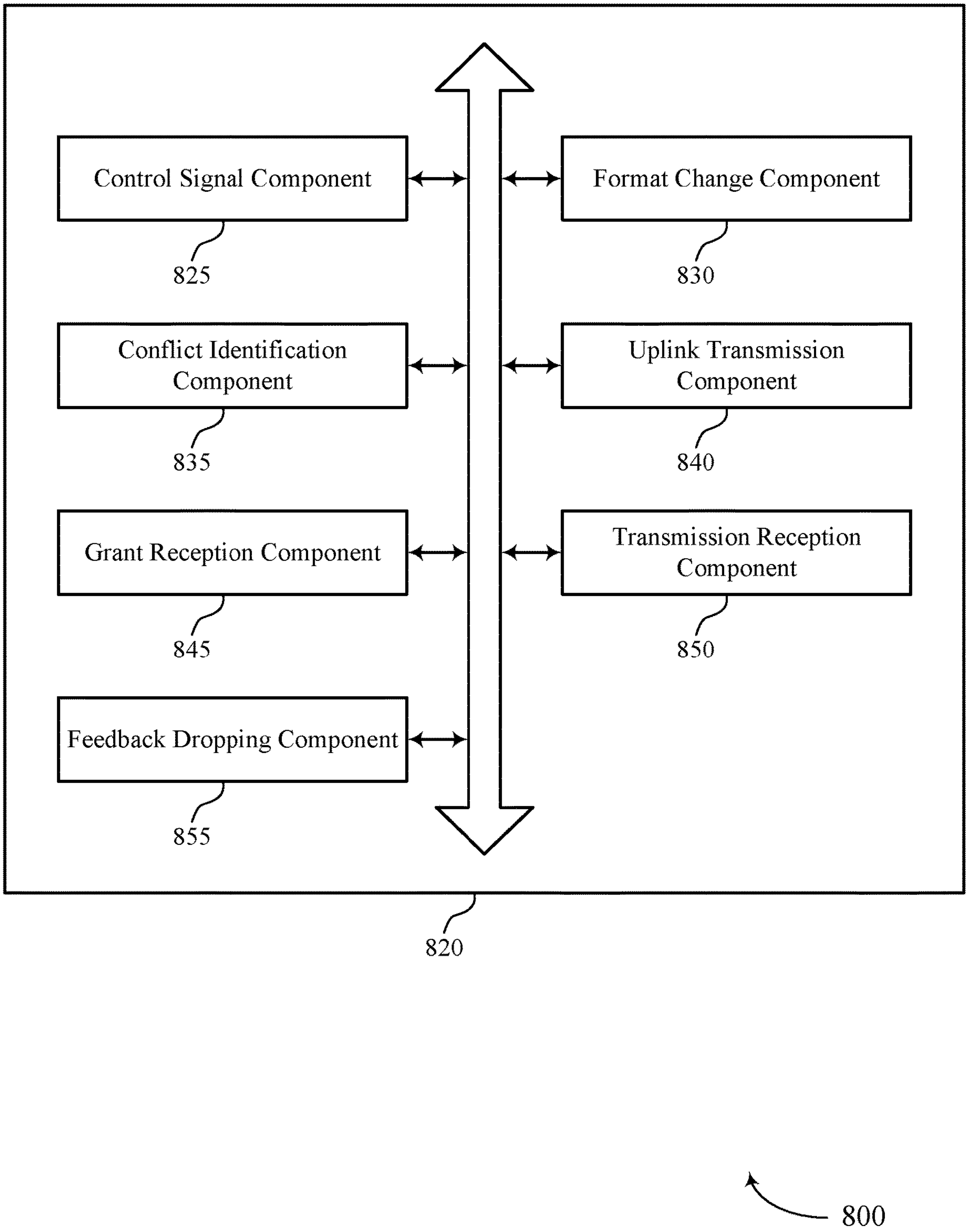
FIG. 8 shows a block diagram of a communications manager that supports transmission of deferred feedback via uplink shared channel in accordance with aspects of the present disclosure.

FIG. 8 shows a block diagram 800 of a communications manager 820 that supports transmission of deferred feedback via uplink shared channel in accordance with aspects of the present disclosure. The communications manager 820 may be an example of aspects of a communications manager 620, a communications manager 720, or both, as described herein. The communications manager 820, or various components thereof, may be an example of means for performing various aspects of transmission of deferred feedback as described herein. For example, the communications manager 820 may include a control signal component 825, a format change component 830, a conflict identification component 835, an uplink transmission component 840, a grant reception component 845, a transmission reception component 850, a feedback dropping component 855, or any combination thereof. Each of these components may communicate, directly or indirectly, with one another (e.g., via one or more buses).

The communications manager 820 may support wireless communication at a UE in accordance with examples as disclosed herein. The control signal component 825 may be configured as or otherwise support a means for receiving control signaling configuring periodic resources for receiving semi-persistent scheduled downlink transmissions. The format change component 830 may be configured as or otherwise support a means for receiving a control message indicating a change to a transmission time interval format. The conflict identification component 835 may be configured as or otherwise support a means for identifying a conflict for a symbol period between uplink transmission of feedback for a first semi-persistent scheduled downlink transmission and downlink reception based on the change to the transmission time interval format. The uplink transmission component 840 may be configured as or otherwise support a means for transmitting, in an uplink shared channel resource of the transmission time interval format that differs from the symbol period, an uplink message including uplink data multiplexed with the feedback based on the conflict.

In some examples, the grant reception component 845 may be configured as or otherwise support a means for receiving a grant indicating the uplink shared channel resource that occurs after an uplink control channel resource of the transmission time interval format. In some examples, the transmission reception component 850 may be configured as or otherwise support a means for receiving a respective semi-persistent scheduled downlink transmission of the semi-persistent scheduled downlink transmissions via the periodic resources based on the control signaling.

In some examples, the grant reception component 845 may be configured as or otherwise support a means for receiving a grant indicating the uplink shared channel resource that occurs after an uplink control channel resource of the transmission time interval format and prior to an end of a feedback deferral time window associated with providing the feedback for the first semi-persistent scheduled downlink transmission. In some examples, to support transmitting the uplink message, the uplink transmission component 840 may be configured as or otherwise support a means for transmitting the uplink message including the uplink data multiplexed with the feedback based on an allocated size of the uplink shared channel resource being sufficient to transport the uplink message.

In some examples, to support transmitting the uplink message, the uplink transmission component 840 may be configured as or otherwise support a means for transmitting the uplink message in the uplink shared channel resource that occurs after an uplink control channel resource. In some examples, the grant reception component 845 may be configured as or otherwise support a means for receiving a grant indicating the uplink shared channel resource that occurs after an uplink control channel resource of the transmission time interval format and after a feedback deferral time window associated with providing a deferred feedback. In some examples, the uplink transmission component 840 may be configured as or otherwise support a means for transmitting the deferred feedback in the uplink control channel resource.

In some examples, the control signal component 825 may be configured as or otherwise support a means for receiving second control signaling indicating a configured grant resource. In some examples, the uplink transmission component 840 may be configured as or otherwise support a means for transmitting the uplink message in the uplink shared channel resource within the configured grant resource.

In some examples, to support transmitting the uplink message, the uplink transmission component 840 may be configured as or otherwise support a means for transmitting the uplink message including the uplink data that is multiplexed with the feedback, the uplink data including a scheduling request, channel state information, or both.

In some examples, the feedback is associated with a most recent semi-persistent scheduled downlink transmission of the semi-persistent scheduled downlink transmissions that is prioritized relative to deferred feedback for an earlier semi-persistent scheduled downlink transmission of the semi-persistent scheduled downlink transmissions.

In some examples, the feedback dropping component 855 may be configured as or otherwise support a means for dropping deferred feedback corresponding to a prior semi-persistent scheduled downlink transmission based on an allocated size of the uplink shared channel resource being insufficient to transport the deferred feedback in the uplink message. In some examples, the feedback includes one or more bits. In some examples, the uplink shared channel resource includes a scheduled uplink shared channel resource.

Figure 9:
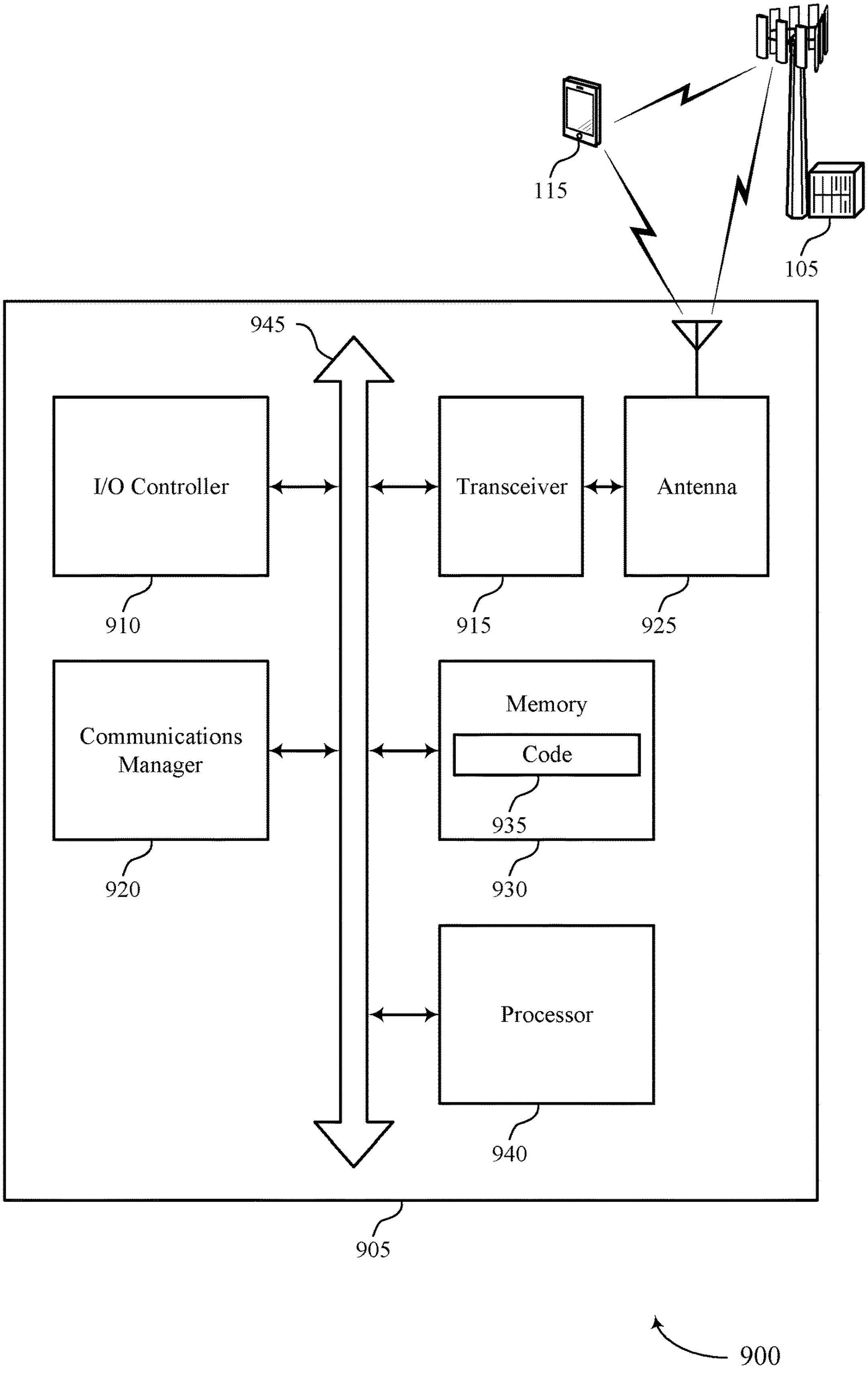
FIG. 9 shows a diagram of a system including a device that supports transmission of deferred feedback via uplink shared channel in accordance with aspects of the present disclosure.

FIG. 9 shows a diagram of a system 900 including a device 905 that supports transmission of deferred feedback via uplink shared channel in accordance with aspects of the present disclosure. The device 905 may be an example of or include the components of a device 605, a device 705, or a UE 115 as described herein. The device 905 may communicate wirelessly with one or more network entities 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting transmission of deferred feedback). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving control signaling configuring periodic resources for receiving semi-persistent scheduled downlink transmissions. The communications manager 920 may be configured as or otherwise support a means for receiving a control message indicating a change to a transmission time interval format. The communications manager 920 may be configured as or otherwise support a means for identifying a conflict for a symbol period between uplink transmission of feedback for a first semi-persistent scheduled downlink transmission and downlink reception based on the change to the transmission time interval format. The communications manager 920 may be configured as or otherwise support a means for transmitting, in an uplink shared channel resource of the transmission time interval format that differs from the symbol period, an uplink message including uplink data multiplexed with the feedback based on the conflict.

By including or configuring the communications manager 920 in accordance with examples as described herein, the device 905 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of transmission of deferred feedback as described herein, or the processor 940 and the memory 930 may be otherwise configured to perform or support such operations.

Figure 10:
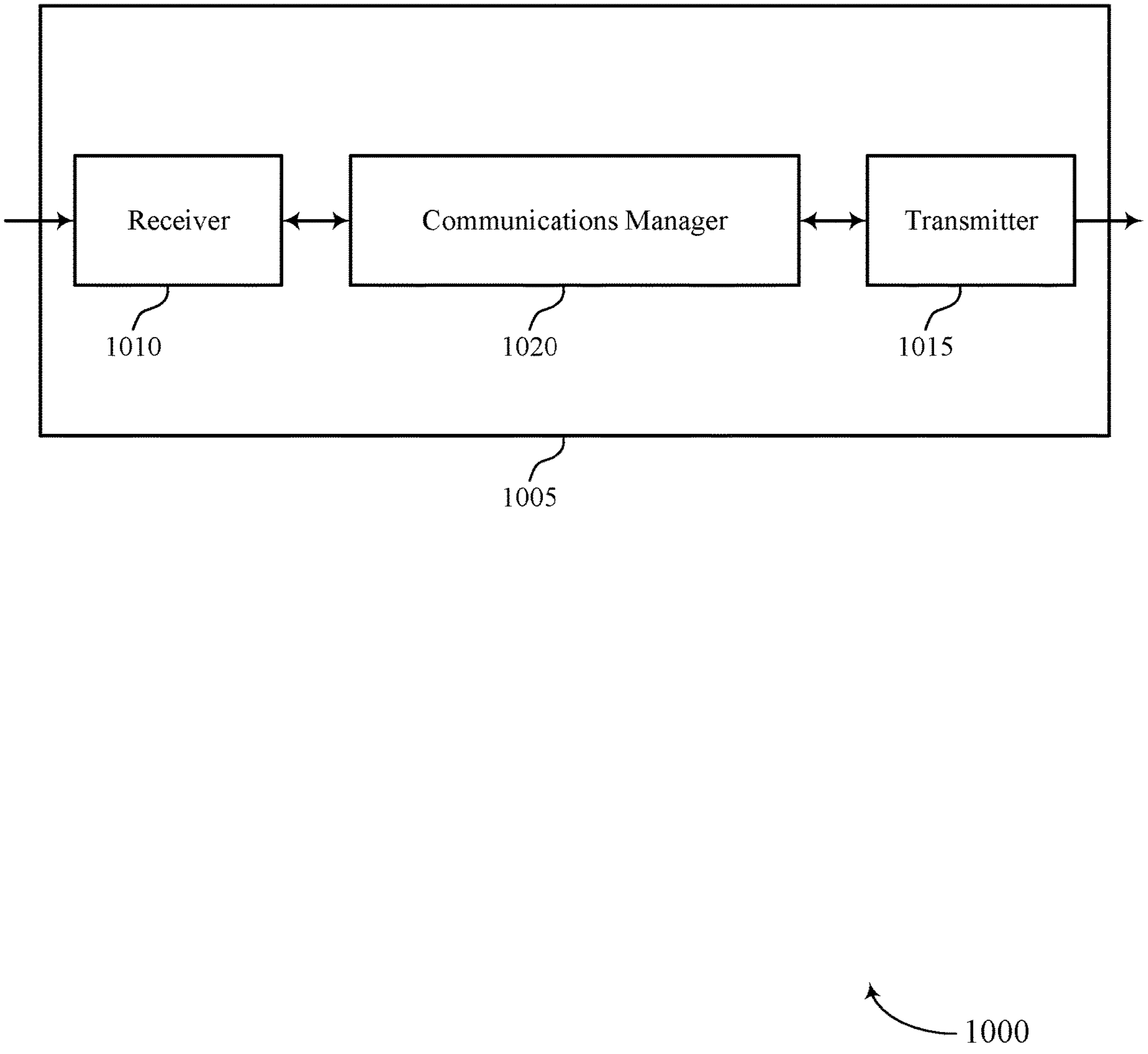
FIGS. 10 and 11 show block diagrams of devices that support transmission of deferred feedback via uplink shared channel in accordance with aspects of the present disclosure.

FIG. 10 shows a block diagram 1000 of a device 1005 that supports transmission of deferred feedback via uplink shared channel in accordance with aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to transmission of deferred feedback). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to transmission of deferred feedback). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of transmission of deferred feedback as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a network entity in accordance with examples as disclosed herein. For example, the communications manager 1020 may be configured as or otherwise support a means for transmitting control signaling configuring periodic resources for receiving semi-persistent scheduled downlink transmissions. The communications manager 1020 may be configured as or otherwise support a means for transmitting a control message indicating a change to a transmission time interval format. The communications manager 1020 may be configured as or otherwise support a means for identifying a conflict for a symbol period between uplink transmission of feedback for a first semi-persistent scheduled downlink transmission and for downlink reception based on the change to the transmission time interval format. The communications manager 1020 may be configured as or otherwise support a means for receiving, in an uplink shared channel resource of the transmission time interval format that differs from the symbol period, an uplink message including uplink data multiplexed with the feedback based on the conflict.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for reduced processing, reduced power consumption, and more efficient utilization of communication resources.

Figure 11:
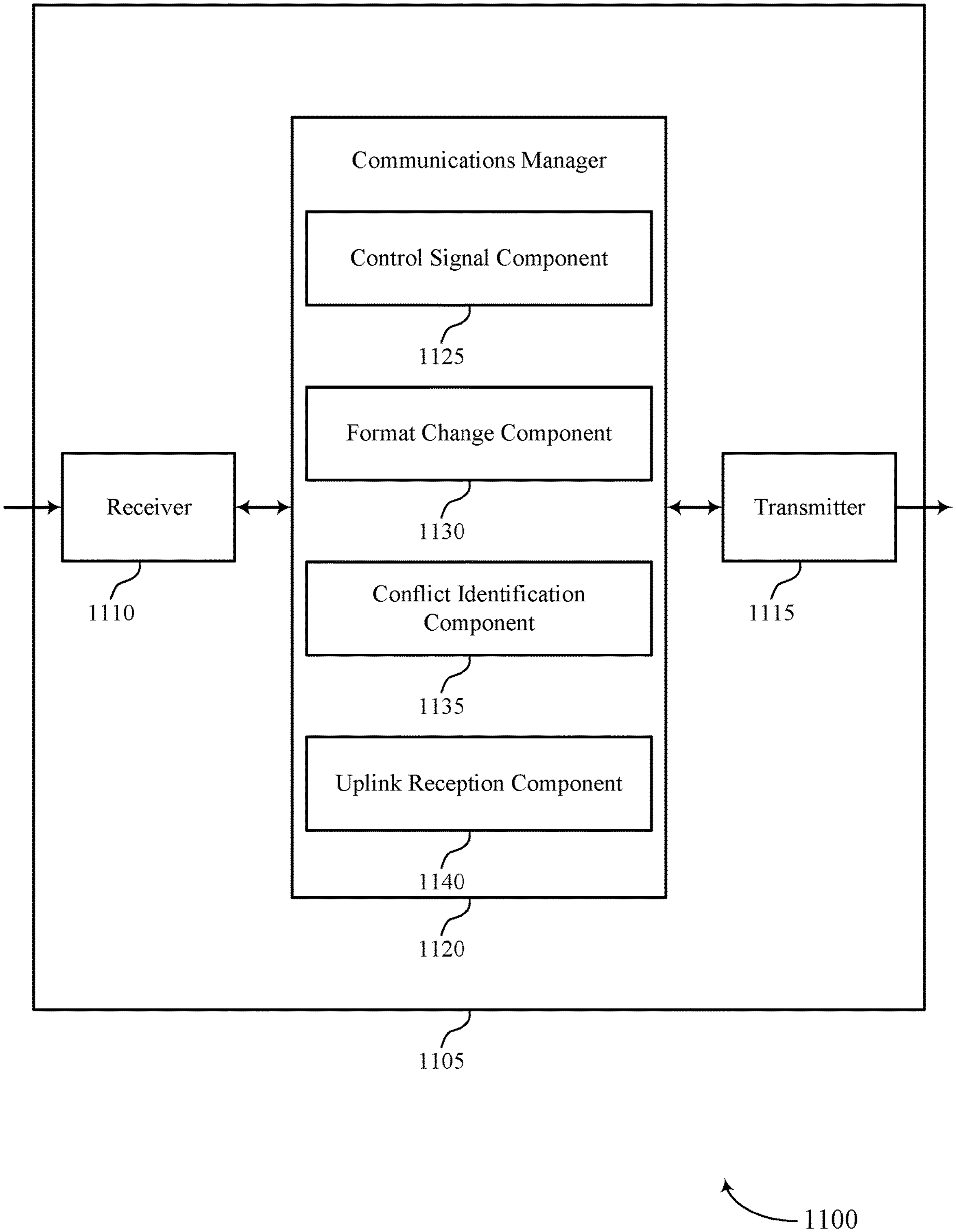

FIG. 11 shows a block diagram 1100 of a device 1105 that supports transmission of deferred feedback via uplink shared channel in accordance with aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to transmission of deferred feedback). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to transmission of deferred feedback). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of transmission of deferred feedback as described herein. For example, the communications manager 1120 may include a control signal component 1125, a format change component 1130, a conflict identification component 1135, an uplink reception component 1140, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a network entity in accordance with examples as disclosed herein. The control signal component 1125 may be configured as or otherwise support a means for transmitting control signaling configuring periodic resources for receiving semi-persistent scheduled downlink transmissions. The format change component 1130 may be configured as or otherwise support a means for transmitting a control message indicating a change to a transmission time interval format. The conflict identification component 1135 may be configured as or otherwise support a means for identifying a conflict for a symbol period between uplink transmission of feedback for a first semi-persistent scheduled downlink transmission and for downlink reception based on the change to the transmission time interval format. The uplink reception component 1140 may be configured as or otherwise support a means for receiving, in an uplink shared channel resource of the transmission time interval format that differs from the symbol period, an uplink message including uplink data multiplexed with the feedback based on the conflict.

Figure 12:
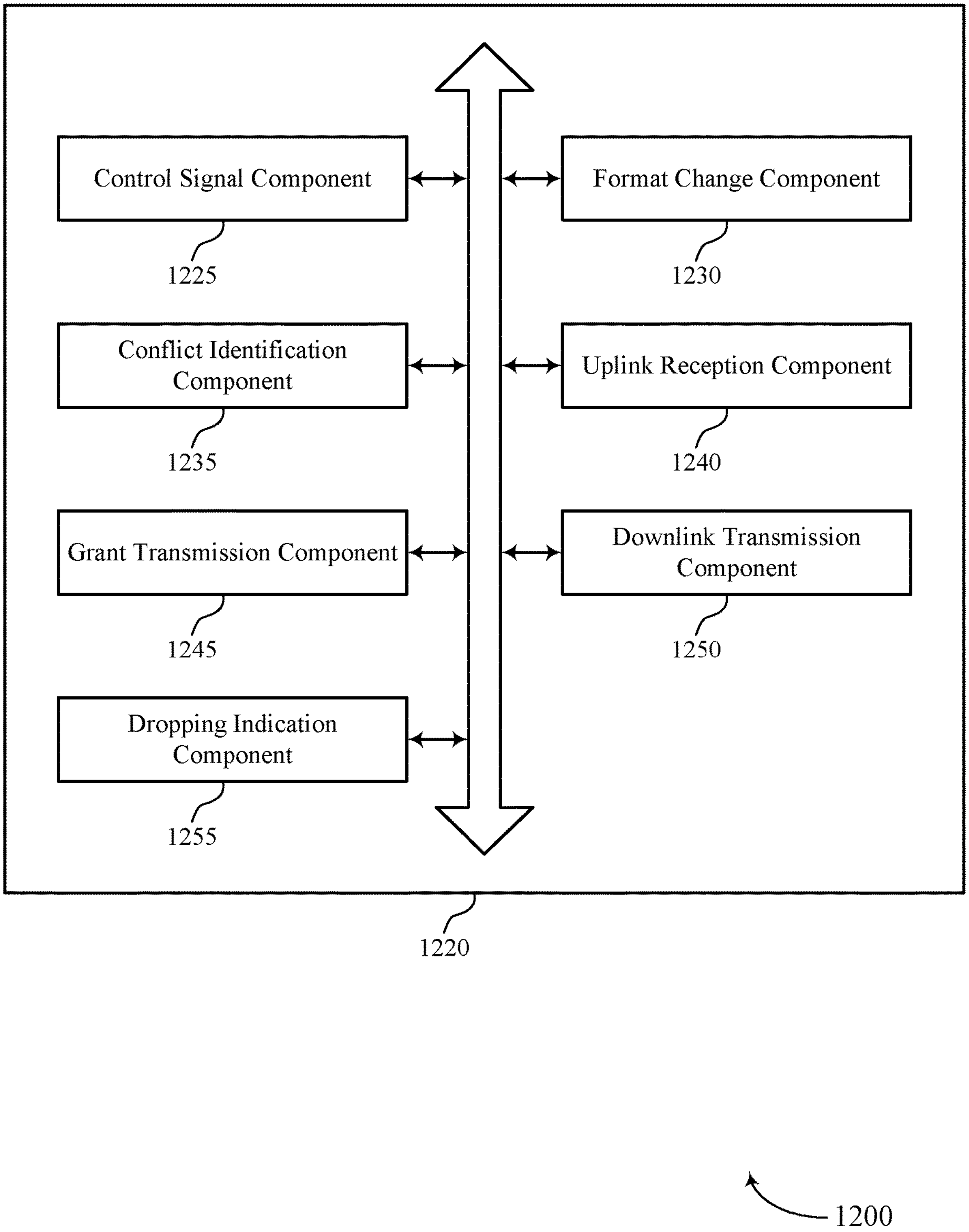
FIG. 12 shows a block diagram of a communications manager that supports transmission of deferred feedback via uplink shared channel in accordance with aspects of the present disclosure.

FIG. 12 shows a block diagram 1200 of a communications manager 1220 that supports transmission of deferred feedback via uplink shared channel in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of transmission of deferred feedback as described herein. For example, the communications manager 1220 may include a control signal component 1225, a format change component 1230, a conflict identification component 1235, an uplink reception component 1240, a grant transmission component 1245, a downlink transmission component 1250, a dropping indication component 1255, or any combination thereof. Each of these components may communicate, directly or indirectly, with one another (e.g., via one or more buses).

The communications manager 1220 may support wireless communication at a network entity in accordance with examples as disclosed herein. The control signal component 1225 may be configured as or otherwise support a means for transmitting control signaling configuring periodic resources for receiving semi-persistent scheduled downlink transmissions. The format change component 1230 may be configured as or otherwise support a means for transmitting a control message indicating a change to a transmission time interval format. The conflict identification component 1235 may be configured as or otherwise support a means for identifying a conflict for a symbol period between uplink transmission of feedback for a first semi-persistent scheduled downlink transmission and for downlink reception based on the change to the transmission time interval format. The uplink reception component 1240 may be configured as or otherwise support a means for receiving, in an uplink shared channel resource of the transmission time interval format that differs from the symbol period, an uplink message including uplink data multiplexed with the feedback based on the conflict.

In some examples, the grant transmission component 1245 may be configured as or otherwise support a means for transmitting a grant indicating the uplink shared channel resource that occurs after an uplink control channel resource of the transmission time interval format. In some examples, the downlink transmission component 1250 may be configured as or otherwise support a means for transmitting a respective semi-persistent scheduled downlink transmission of the semi-persistent scheduled downlink transmissions via the periodic resources based on the control signaling.

In some examples, the grant transmission component 1245 may be configured as or otherwise support a means for transmitting a grant indicating the uplink shared channel resource that occurs after an uplink control channel resource of the transmission time interval format and prior to an end of a feedback deferral time window associated with providing the feedback for the first semi-persistent scheduled downlink transmission.

In some examples, to support receiving the uplink message, the uplink reception component 1240 may be configured as or otherwise support a means for receiving the uplink message including the uplink data multiplexed with the feedback based on an allocated size of the uplink shared channel resource being sufficient to transport the uplink message. In some examples, to support receiving the uplink message, the uplink reception component 1240 may be configured as or otherwise support a means for receiving the uplink message in the uplink shared channel resource that occurs after an uplink control channel resource.

In some examples, the grant transmission component 1245 may be configured as or otherwise support a means for transmitting a grant indicating the uplink shared channel resource that occurs after an uplink control channel resource of the transmission time interval format and after a feedback deferral time window associated with providing a deferred feedback. In some examples, the uplink reception component 1240 may be configured as or otherwise support a means for receiving the deferred feedback in the uplink control channel resource.

In some examples, the control signal component 1225 may be configured as or otherwise support a means for transmitting second control signaling indicating a configured grant resource. In some examples, the uplink reception component 1240 may be configured as or otherwise support a means for receiving the uplink message in the uplink shared channel resource within the configured grant resource. In some examples, to support receiving the uplink message, the uplink reception component 1240 may be configured as or otherwise support a means for receiving the uplink message including the uplink data that is multiplexed with the feedback, the uplink data including a scheduling request, channel state information, or both.

In some examples, the feedback is associated with a most recent semi-persistent scheduled downlink transmission of the semi-persistent scheduled downlink transmissions that is prioritized relative to deferred feedback for an earlier semi-persistent scheduled downlink transmission of the semi-persistent scheduled downlink transmissions.

In some examples, the dropping indication component 1255 may be configured as or otherwise support a means for transmitting an indication to drop deferred feedback corresponding to a prior semi-persistent scheduled downlink transmission based on an allocated size of the uplink shared channel resource being insufficient to transport the deferred feedback in the uplink message. In some examples, the feedback includes one or more bits. In some examples, the uplink shared channel resource includes a scheduled uplink shared channel resource.

Figure 13:
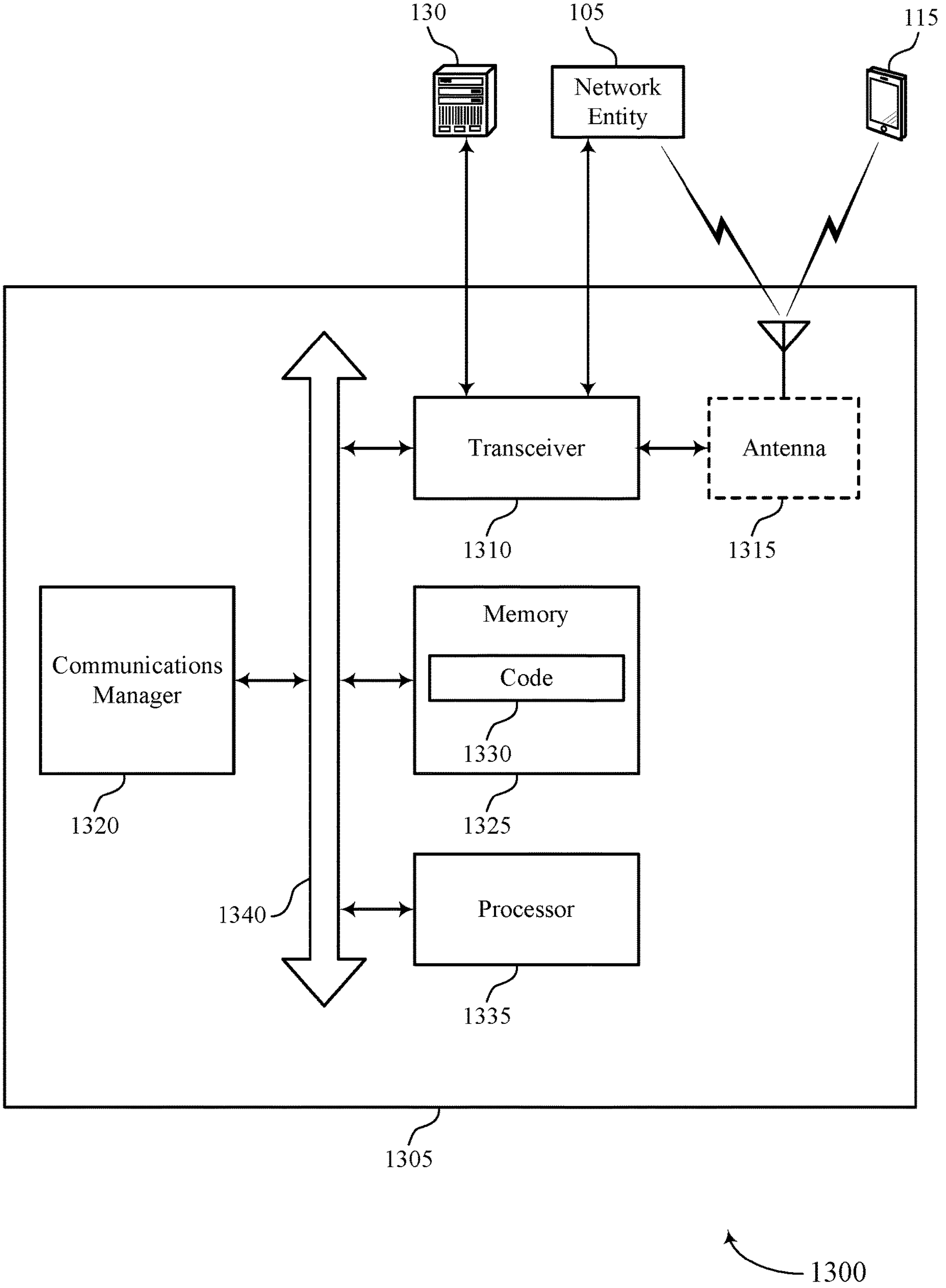
FIG. 13 shows a diagram of a system including a device that supports transmission of deferred feedback via uplink shared channel in accordance with aspects of the present disclosure.

FIG. 13 shows a diagram of a system 1300 including a device 1305 that supports transmission of deferred feedback via uplink shared channel in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting transmission of deferred feedback via uplink shared channel). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for transmitting control signaling configuring periodic resources for receiving semi-persistent scheduled downlink transmissions. The communications manager 1320 may be configured as or otherwise support a means for transmitting a control message indicating a change to a transmission time interval format. The communications manager 1320 may be configured as or otherwise support a means for identifying a conflict for a symbol period between uplink transmission of feedback for a first semi-persistent scheduled downlink transmission and for downlink reception based on the change to the transmission time interval format. The communications manager 1320 may be configured as or otherwise support a means for receiving, in an uplink shared channel resource of the transmission time interval format that differs from the symbol period, an uplink message including uplink data multiplexed with the feedback based on the conflict.

By including or configuring the communications manager 1320 in accordance with examples as described herein, the device 1305 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of transmission of deferred feedback via uplink shared channel as described herein, or the processor 1335 and the memory 1325 may be otherwise configured to perform or support such operations.

Figure 14:
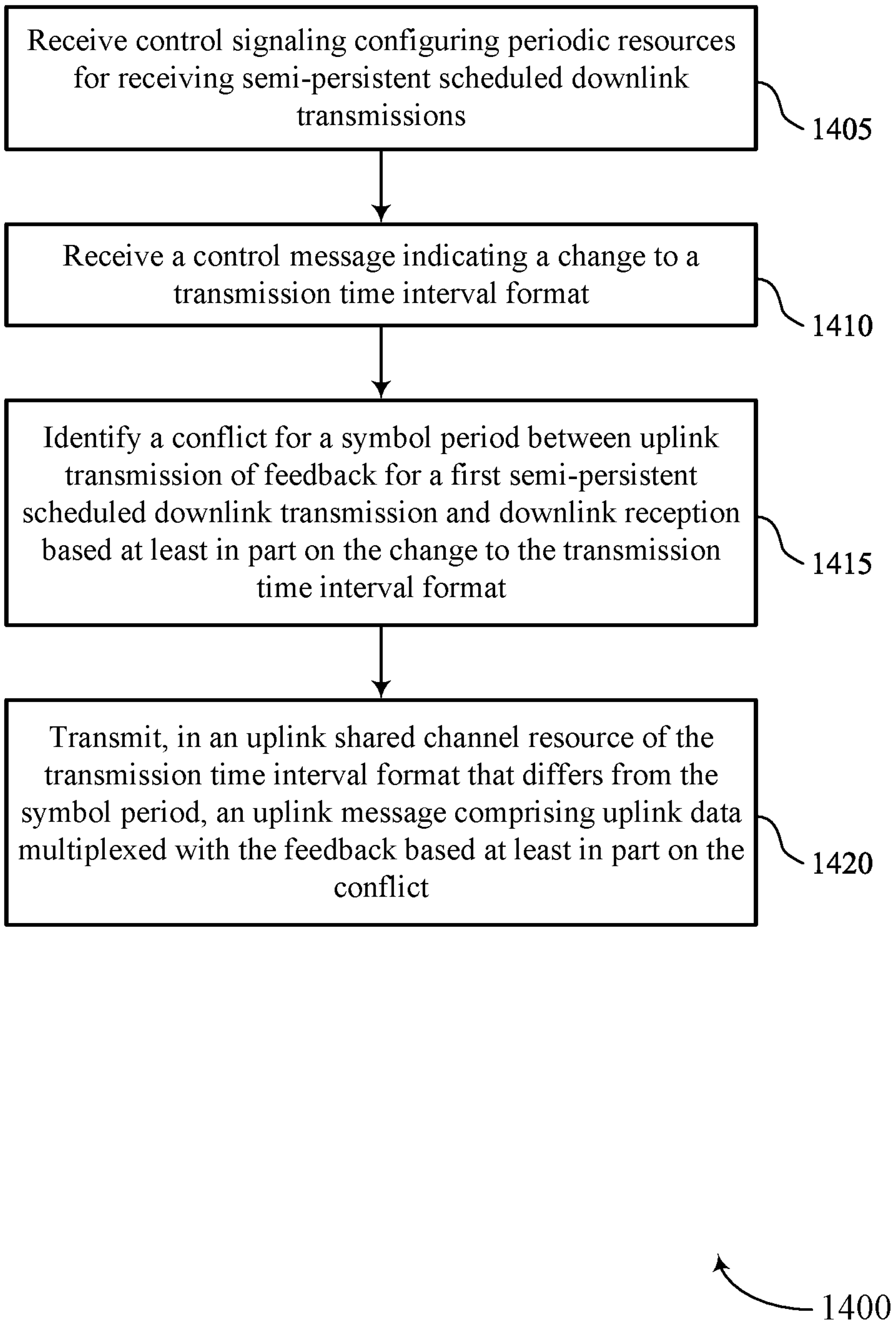
FIGS. 14 through 17 show flowcharts illustrating methods that support transmission of deferred feedback via uplink shared channel in accordance with aspects of the present disclosure.

FIG. 14 shows a flowchart illustrating a method 1400 that supports transmission of deferred feedback via uplink shared channel in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving control signaling configuring periodic resources for receiving semi-persistent scheduled downlink transmissions. The operations of 1405 may be performed in accordance with examples as disclosed herein. In some examples, aspects of the operations of 1405 may be performed by a control signal component 825 as described with reference to FIG. 8.

At 1410, the method may include receiving a control message indicating a change to a transmission time interval format. The operations of 1410 may be performed in accordance with examples as disclosed herein. In some examples, aspects of the operations of 1410 may be performed by a format change component 830 as described with reference to FIG. 8.

At 1415, the method may include identifying a conflict for a symbol period between uplink transmission of feedback for a first semi-persistent scheduled downlink transmission and downlink reception based on the change to the transmission time interval format. The operations of 1415 may be performed in accordance with examples as disclosed herein. In some examples, aspects of the operations of 1415 may be performed by a conflict identification component 835 as described with reference to FIG. 8.

At 1420, the method may include transmitting, in an uplink shared channel resource of the transmission time interval format that differs from the symbol period, an uplink message including uplink data multiplexed with the feedback based on the conflict. The operations of 1420 may be performed in accordance with examples as disclosed herein. In some examples, aspects of the operations of 1420 may be performed by an uplink transmission component 840 as described with reference to FIG. 8.

Figure 15:
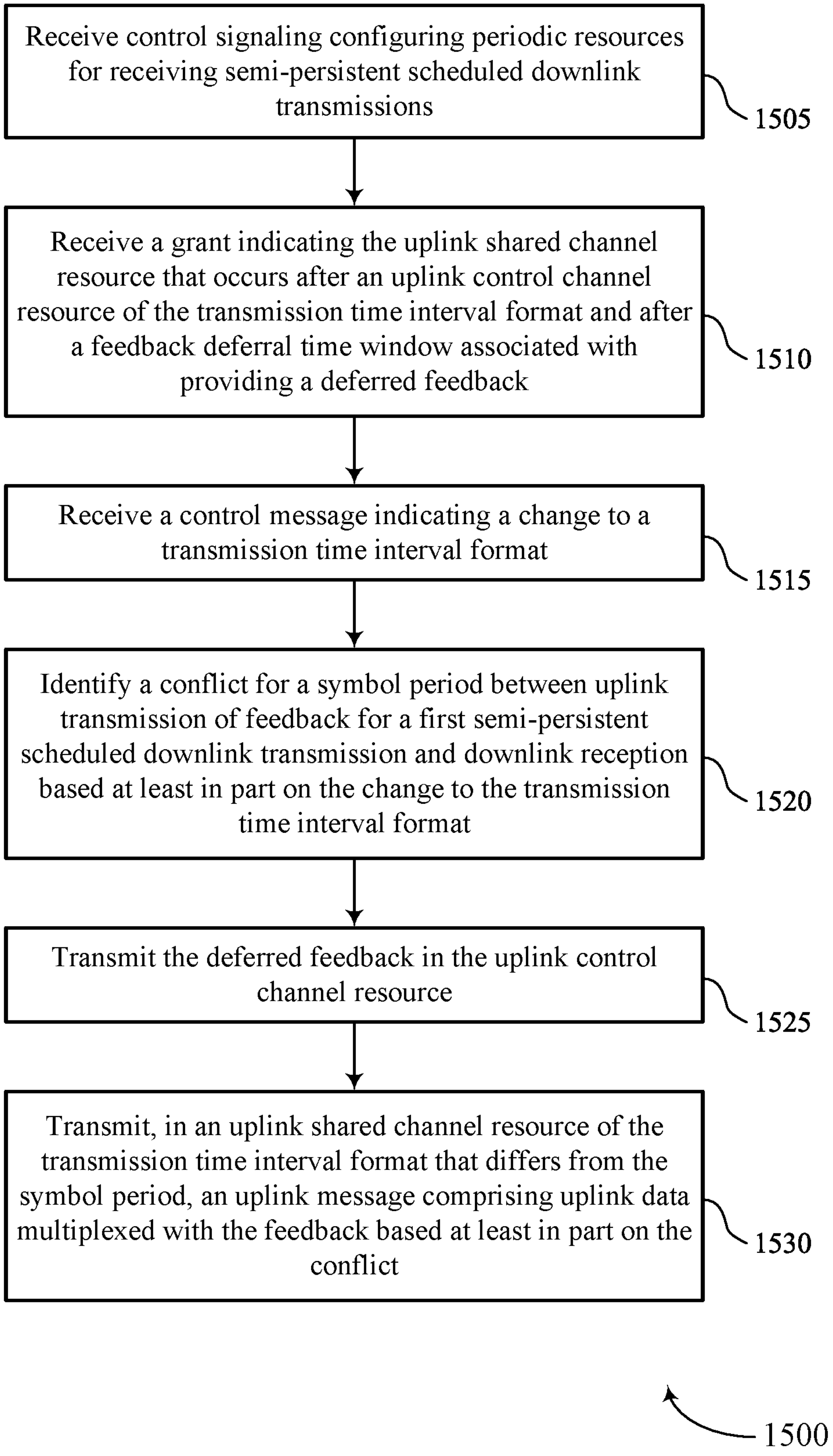

FIG. 15 shows a flowchart illustrating a method 1500 that supports transmission of deferred feedback via uplink shared channel in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving control signaling configuring periodic resources for receiving semi-persistent scheduled downlink transmissions. The operations of 1505 may be performed in accordance with examples as disclosed herein. In some examples, aspects of the operations of 1505 may be performed by a control signal component 825 as described with reference to FIG. 8.

At 1510, the method may include receiving a grant indicating the uplink shared channel resource that occurs after an uplink control channel resource of the transmission time interval format and after a feedback deferral time window associated with providing a deferred feedback. The operations of 1510 may be performed in accordance with examples as disclosed herein. In some examples, aspects of the operations of 1510 may be performed by a grant reception component 845 as described with reference to FIG. 8.

At 1515, the method may include receiving a control message indicating a change to a transmission time interval format. The operations of 1515 may be performed in accordance with examples as disclosed herein. In some examples, aspects of the operations of 1515 may be performed by a format change component 830 as described with reference to FIG. 8.

At 1520, the method may include identifying a conflict for a symbol period between uplink transmission of feedback for a first semi-persistent scheduled downlink transmission and downlink reception based on the change to the transmission time interval format. The operations of 1520 may be performed in accordance with examples as disclosed herein. In some examples, aspects of the operations of 1520 may be performed by a conflict identification component 835 as described with reference to FIG. 8.

At 1525, the method may include transmitting the deferred feedback in the uplink control channel resource. The operations of 1525 may be performed in accordance with examples as disclosed herein. In some examples, aspects of the operations of 1525 may be performed by an uplink transmission component 840 as described with reference to FIG. 8.

At 1530, the method may include transmitting, in an uplink shared channel resource of the transmission time interval format that differs from the symbol period, an uplink message including uplink data multiplexed with the feedback based on the conflict. The operations of 1530 may be performed in accordance with examples as disclosed herein. In some examples, aspects of the operations of 1530 may be performed by an uplink transmission component 840 as described with reference to FIG. 8.

Figure 16:
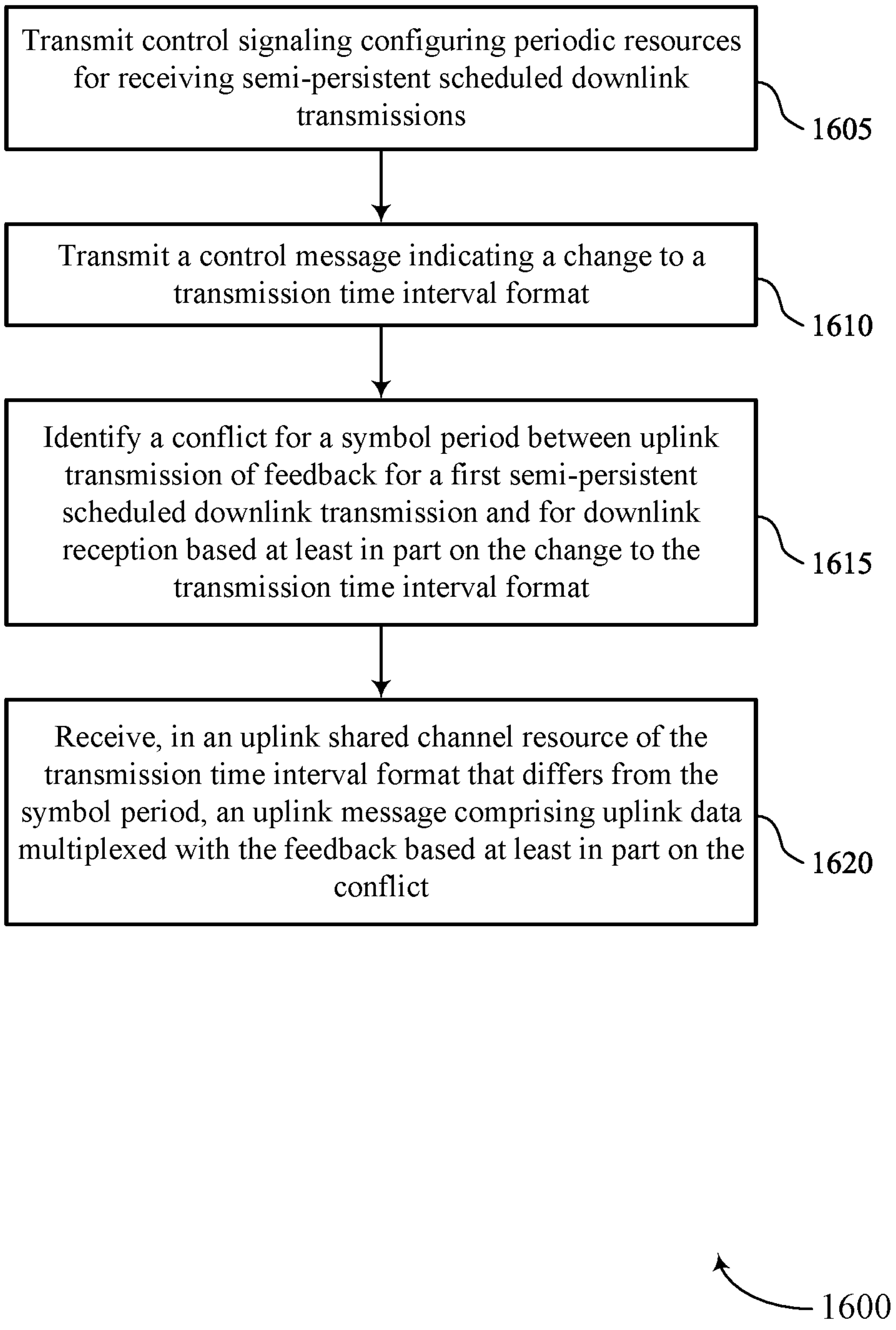

FIG. 16 shows a flowchart illustrating a method 1600 that supports transmission of deferred feedback via uplink shared channel in accordance with aspects of the present disclosure. The operations of the method 1600 may be implemented by a network entity or its components as described herein. For example, the operations of the method 1600 may be performed by a network entity 105 as described with reference to FIGS. 1 through 5 and 10 through 13. In some examples, a network entity may execute a set of instructions to control the functional elements of the network entity to perform the described functions. Additionally or alternatively, the network entity may perform aspects of the described functions using special-purpose hardware.

At 1605, the method may include transmitting control signaling configuring periodic resources for receiving semi-persistent scheduled downlink transmissions. The operations of 1605 may be performed in accordance with examples as disclosed herein. In some examples, aspects of the operations of 1605 may be performed by a control signal component 1225 as described with reference to FIG. 12.

At 1610, the method may include transmitting a control message indicating a change to a transmission time interval format. The operations of 1610 may be performed in accordance with examples as disclosed herein. In some examples, aspects of the operations of 1610 may be performed by a format change component 1230 as described with reference to FIG. 12.

At 1615, the method may include identifying a conflict for a symbol period between uplink transmission of feedback for a first semi-persistent scheduled downlink transmission and for downlink reception based on the change to the transmission time interval format. The operations of 1615 may be performed in accordance with examples as disclosed herein. In some examples, aspects of the operations of 1615 may be performed by a conflict identification component 1235 as described with reference to FIG. 12.

At 1620, the method may include receiving, in an uplink shared channel resource of the transmission time interval format that differs from the symbol period, an uplink message including uplink data multiplexed with the feedback based on the conflict. The operations of 1620 may be performed in accordance with examples as disclosed herein. In some examples, aspects of the operations of 1620 may be performed by an uplink reception component 1240 as described with reference to FIG. 12.

Figure 17:
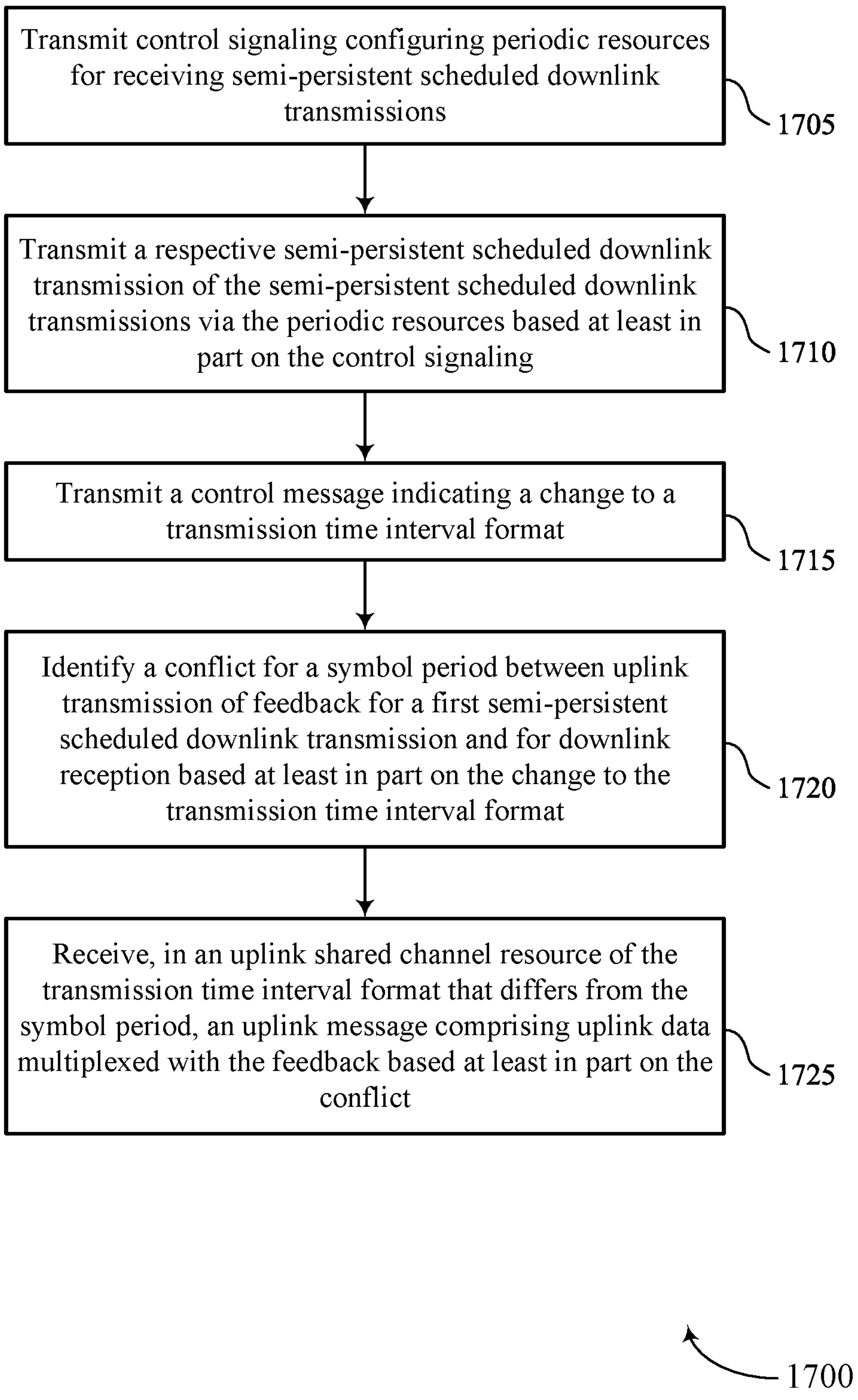

FIG. 17 shows a flowchart illustrating a method 1700 that supports transmission of deferred feedback via uplink shared channel in accordance with aspects of the present disclosure. The operations of the method 1700 may be implemented by a network entity or its components as described herein. For example, the operations of the method 1700 may be performed by a network entity 105 as described with reference to FIGS. 1 through 5 and 10 through 13. In some examples, a network entity may execute a set of instructions to control the functional elements of the network entity to perform the described functions. Additionally or alternatively, the network entity may perform aspects of the described functions using special-purpose hardware.

At 1705, the method may include transmitting control signaling configuring periodic resources for receiving semi-persistent scheduled downlink transmissions. The operations of 1705 may be performed in accordance with examples as disclosed herein. In some examples, aspects of the operations of 1705 may be performed by a control signal component 1225 as described with reference to FIG. 12.

At 1710, the method may include transmitting a respective semi-persistent scheduled downlink transmission of the semi-persistent scheduled downlink transmissions via the periodic resources based on the control signaling. The operations of 1710 may be performed in accordance with examples as disclosed herein. In some examples, aspects of the operations of 1710 may be performed by a downlink transmission component 1250 as described with reference to FIG. 12.

At 1715, the method may include transmitting a control message indicating a change to a transmission time interval format. The operations of 1715 may be performed in accordance with examples as disclosed herein. In some examples, aspects of the operations of 1715 may be performed by a format change component 1230 as described with reference to FIG. 12.

At 1720, the method may include identifying a conflict for a symbol period between uplink transmission of feedback for a first semi-persistent scheduled downlink transmission and for downlink reception based on the change to the transmission time interval format. The operations of 1720 may be performed in accordance with examples as disclosed herein. In some examples, aspects of the operations of 1720 may be performed by a conflict identification component 1235 as described with reference to FIG. 12.

At 1725, the method may include receiving, in an uplink shared channel resource of the transmission time interval format that differs from the symbol period, an uplink message including uplink data multiplexed with the feedback based on the conflict. The operations of 1725 may be performed in accordance with examples as disclosed herein. In some examples, aspects of the operations of 1725 may be performed by an uplink reception component 1240 as described with reference to FIG. 12.

The following provides an overview of aspects of the present disclosure:

Aspect 1: A method for wireless communication at a UE, comprising: receiving control signaling configuring periodic resources for receiving semi-persistent scheduled downlink transmissions; receiving a control message indicating a change to a transmission time interval format; identifying a conflict for a symbol period between uplink transmission of feedback for a first semi-persistent scheduled downlink transmission and downlink reception based at least in part on the change to the transmission time interval format; and transmitting, in an uplink shared channel resource of the transmission time interval format that differs from the symbol period, an uplink message comprising uplink data multiplexed with the feedback based at least in part on the conflict.

Aspect 2: The method of aspect 1, further comprising: receiving a grant indicating the uplink shared channel resource that occurs after an uplink control channel resource of the transmission time interval format.

Aspect 3: The method of any of aspects 1 through 2, further comprising: receiving a respective semi-persistent scheduled downlink transmission of the semi-persistent scheduled downlink transmissions via the periodic resources based at least in part on the control signaling.

Aspect 4: The method of any of aspects 1 through 3, further comprising: receiving a grant indicating the uplink shared channel resource that occurs after an uplink control channel resource of the transmission time interval format and prior to an end of a feedback deferral time window associated with providing the feedback for the first semi-persistent scheduled downlink transmission.

Aspect 5: The method of any of aspects 1 through 4, wherein transmitting the uplink message further comprises: transmitting the uplink message comprising the uplink data multiplexed with the feedback based at least in part on an allocated size of the uplink shared channel resource being sufficient to transport the uplink message.

Aspect 6: The method of any of aspects 1 through 5, wherein transmitting the uplink message further comprises: transmitting the uplink message in the uplink shared channel resource that occurs after an uplink control channel resource.

Aspect 7: The method of any of aspects 1 through 6, further comprising: receiving a grant indicating the uplink shared channel resource that occurs after an uplink control channel resource of the transmission time interval format and after a feedback deferral time window associated with providing a deferred feedback; and transmitting the deferred feedback in the uplink control channel resource.

Aspect 8: The method of any of aspects 1 through 7, further comprising: receiving second control signaling indicating a configured grant resource; and transmitting the uplink message in the uplink shared channel resource within the configured grant resource.

Aspect 9: The method of any of aspects 1 through 8, wherein transmitting the uplink message further comprises: transmitting the uplink message comprising the uplink data that is multiplexed with the feedback, the uplink data comprising a scheduling request, channel state information, or both.

Aspect 10: The method of any of aspects 1 through 9, wherein the feedback is associated with a most recent semi-persistent scheduled downlink transmission of the semi-persistent scheduled downlink transmissions that is prioritized relative to deferred feedback for an earlier semi-persistent scheduled downlink transmission of the semi-persistent scheduled downlink transmissions.

Aspect 11: The method of any of aspects 1 through 10, further comprising: dropping deferred feedback corresponding to a prior semi-persistent scheduled downlink transmission based at least in part on an allocated size of the uplink shared channel resource being insufficient to transport the deferred feedback in the uplink message.

Aspect 12: The method of any of aspects 1 through 11, wherein the feedback comprises one or more bits.

Aspect 13: The method of any of aspects 1 through 12, wherein the uplink shared channel resource comprises a scheduled uplink shared channel resource.

Aspect 14: A method for wireless communication at a network entity, comprising: transmitting control signaling configuring periodic resources for receiving semi-persistent scheduled downlink transmissions; transmitting a control message indicating a change to a transmission time interval format; identifying a conflict for a symbol period between uplink transmission of feedback for a first semi-persistent scheduled downlink transmission and for downlink reception based at least in part on the change to the transmission time interval format; and receiving, in an uplink shared channel resource of the transmission time interval format that differs from the symbol period, an uplink message comprising uplink data multiplexed with the feedback based at least in part on the conflict.

Aspect 15: The method of aspect 14, further comprising: transmitting a grant indicating the uplink shared channel resource that occurs after an uplink control channel resource of the transmission time interval format.

Aspect 16: The method of any of aspects 14 through 15, further comprising: transmitting a respective semi-persistent scheduled downlink transmission of the semi-persistent scheduled downlink transmissions via the periodic resources based at least in part on the control signaling.

Aspect 17: The method of any of aspects 14 through 16, further comprising: transmitting a grant indicating the uplink shared channel resource that occurs after an uplink control channel resource of the transmission time interval format and prior to an end of a feedback deferral time window associated with providing the feedback for the first semi-persistent scheduled downlink transmission.

Aspect 18: The method of any of aspects 14 through 17, wherein receiving the uplink message further comprises: receiving the uplink message comprising the uplink data multiplexed with the feedback based at least in part on an allocated size of the uplink shared channel resource being sufficient to transport the uplink message.

Aspect 19: The method of any of aspects 14 through 18, wherein receiving the uplink message further comprises: receiving the uplink message in the uplink shared channel resource that occurs after an uplink control channel resource.

Aspect 20: The method of any of aspects 14 through 19, further comprising: transmitting a grant indicating the uplink shared channel resource that occurs after an uplink control channel resource of the transmission time interval format and after a feedback deferral time window associated with providing a deferred feedback; and receiving the deferred feedback in the uplink control channel resource.

Aspect 21: The method of any of aspects 14 through 20, further comprising: transmitting second control signaling indicating a configured grant resource; and receiving the uplink message in the uplink shared channel resource within the configured grant resource.

Aspect 22: The method of any of aspects 14 through 21, wherein receiving the uplink message further comprises: receiving the uplink message comprising the uplink data that is multiplexed with the feedback, the uplink data comprising a scheduling request, channel state information, or both.

Aspect 23: The method of any of aspects 14 through 22, wherein the feedback is associated with a most recent semi-persistent scheduled downlink transmission of the semi-persistent scheduled downlink transmissions that is prioritized relative to deferred feedback for an earlier semi-persistent scheduled downlink transmission of the semi-persistent scheduled downlink transmissions.

Aspect 24: The method of any of aspects 14 through 23, further comprising: transmitting an indication to drop deferred feedback corresponding to a prior semi-persistent scheduled downlink transmission based at least in part on an allocated size of the uplink shared channel resource being insufficient to transport the deferred feedback in the uplink message.

Aspect 25: The method of any of aspects 14 through 24, wherein the feedback comprises one or more bits.

Aspect 26: The method of any of aspects 14 through 25, wherein the uplink shared channel resource comprises a scheduled uplink shared channel resource.

Aspect 27: An apparatus for wireless communication at a UE, comprising a processor; memory coupled with the processor; and instructions stored in the memory and executable by the processor to cause the apparatus to perform a method of any of aspects 1 through 13.

Aspect 28: An apparatus for wireless communication at a UE, comprising at least one means for performing a method of any of aspects 1 through 13.

Aspect 29: A non-transitory computer-readable medium storing code for wireless communication at a UE, the code comprising instructions executable by a processor to perform a method of any of aspects 1 through 13.

Aspect 30: An apparatus for wireless communication at a network entity, comprising a processor; memory coupled with the processor; and instructions stored in the memory and executable by the processor to cause the apparatus to perform a method of any of aspects 14 through 26.

Aspect 31: An apparatus for wireless communication at a network entity, comprising at least one means for performing a method of any of aspects 14 through 26.

Aspect 32: A non-transitory computer-readable medium storing code for wireless communication at a network entity, the code comprising instructions executable by a processor to perform a method of any of aspects 14 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving control signaling configuring periodic resources for receiving semi-persistent scheduled downlink transmissions;

receiving a control message indicating a change to a transmission time interval format;

identifying a conflict for a symbol period between uplink transmission of feedback for a first semi-persistent scheduled downlink transmission and downlink reception based at least in part on the change to the transmission time interval format; and transmitting, in an uplink shared channel resource of the transmission time interval format that differs from the symbol period, an uplink message comprising uplink data multiplexed with the feedback based at least in part on the conflict.

2. The method of claim 1, further comprising:

receiving a grant indicating the uplink shared channel resource that occurs after an uplink control channel resource of the transmission time interval format.

3. The method of claim 1, further comprising:

receiving a respective semi-persistent scheduled downlink transmission of the semi-persistent scheduled downlink transmissions via the periodic resources based at least in part on the control signaling.

4. The method of claim 1, further comprising:

receiving a grant indicating the uplink shared channel resource that occurs after an uplink control channel resource of the transmission time interval format and prior to an end of a feedback deferral time window associated with providing the feedback for the first semi-persistent scheduled downlink transmission.

5. The method of claim 1, wherein transmitting the uplink message further comprises:

transmitting the uplink message comprising the uplink data multiplexed with the feedback based at least in part on an allocated size of the uplink shared channel resource being sufficient to transport the uplink message.

6. The method of claim 1, wherein transmitting the uplink message further comprises:

transmitting the uplink message in the uplink shared channel resource that occurs after an uplink control channel resource.

7. The method of claim 1, further comprising:

receiving a grant indicating the uplink shared channel resource that occurs after an uplink control channel resource of the transmission time interval format and after a feedback deferral time window associated with providing a deferred feedback; and transmitting the deferred feedback in the uplink control channel resource.

8. The method of claim 1, further comprising:

receiving second control signaling indicating a configured grant resource; and transmitting the uplink message in the uplink shared channel resource within the configured grant resource.

9. The method of claim 1, wherein transmitting the uplink message further comprises:

transmitting the uplink message comprising the uplink data that is multiplexed with the feedback, the uplink data comprising a scheduling request, channel state information, or both.

10. The method of claim 1, wherein the feedback is associated with a most recent semi-persistent scheduled downlink transmission of the semi-persistent scheduled downlink transmissions that is prioritized relative to deferred feedback for an earlier semi-persistent scheduled downlink transmission of the semi-persistent scheduled downlink transmissions.

11. The method of claim 1, further comprising:

dropping deferred feedback corresponding to a prior semi-persistent scheduled downlink transmission based at least in part on an allocated size of the uplink shared channel resource being insufficient to transport the deferred feedback in the uplink message.

12. The method of claim 1, wherein the feedback comprises one or more bits.

13. The method of claim 1, wherein the uplink shared channel resource comprises a scheduled uplink shared channel resource.

14. A method for wireless communication at a network entity, comprising:

transmitting control signaling configuring periodic resources for receiving semi-persistent scheduled downlink transmissions;

transmitting a control message indicating a change to a transmission time interval format;

identifying a conflict for a symbol period between uplink transmission of feedback for a first semi-persistent scheduled downlink transmission and for downlink reception based at least in part on the change to the transmission time interval format; and receiving, in an uplink shared channel resource of the transmission time interval format that differs from the symbol period, an uplink message comprising uplink data multiplexed with the feedback based at least in part on the conflict.

15. The method of claim 14, further comprising:

transmitting a grant indicating the uplink shared channel resource that occurs after an uplink control channel resource of the transmission time interval format.

16. The method of claim 14, further comprising:

transmitting a respective semi-persistent scheduled downlink transmission of the semi-persistent scheduled downlink transmissions via the periodic resources based at least in part on the control signaling.

17. The method of claim 14, further comprising:

transmitting a grant indicating the uplink shared channel resource that occurs after an uplink control channel resource of the transmission time interval format and prior to an end of a feedback deferral time window associated with providing the feedback for the first semi-persistent scheduled downlink transmission.

18. The method of claim 14, wherein receiving the uplink message further comprises:

receiving the uplink message comprising the uplink data multiplexed with the feedback based at least in part on an allocated size of the uplink shared channel resource being sufficient to transport the uplink message.

19. The method of claim 14, wherein receiving the uplink message further comprises:

receiving the uplink message in the uplink shared channel resource that occurs after an uplink control channel resource.

20. The method of claim 14, further comprising:

transmitting a grant indicating the uplink shared channel resource that occurs after an uplink control channel resource of the transmission time interval format and after a feedback deferral time window associated with providing a deferred feedback; and receiving the deferred feedback in the uplink control channel resource.

21. The method of claim 14, further comprising:

transmitting second control signaling indicating a configured grant resource; and receiving the uplink message in the uplink shared channel resource within the configured grant resource.

22. The method of claim 14, wherein receiving the uplink message further comprises:

receiving the uplink message comprising the uplink data that is multiplexed with the feedback, the uplink data comprising a scheduling request, channel state information, or both.

23. The method of claim 14, wherein the feedback is associated with a most recent semi-persistent scheduled downlink transmission of the semi-persistent scheduled downlink transmissions that is prioritized relative to deferred feedback for an earlier semi-persistent scheduled downlink transmission of the semi-persistent scheduled downlink transmissions.

24. The method of claim 14, further comprising:

transmitting an indication to drop deferred feedback corresponding to a prior semi-persistent scheduled downlink transmission based at least in part on an allocated size of the uplink shared channel resource being insufficient to transport the deferred feedback in the uplink message.

25. The method of claim 14, wherein the feedback comprises one or more bits.

26. The method of claim 14, wherein the uplink shared channel resource comprises a scheduled uplink shared channel resource.

27. An apparatus for wireless communication at a user equipment (UE), comprising:

one or more processors;

one or more memories coupled with the one or more processors; and instructions stored in the one or more memories and executable by the one or more processors to cause the apparatus to:

receive control signaling configuring periodic resources for receiving semi-persistent scheduled downlink transmissions;

receive a control message indicating a change to a transmission time interval format;

identify a conflict for a symbol period between uplink transmission of feedback for a first semi-persistent scheduled downlink transmission and downlink reception based at least in part on the change to the transmission time interval format; and transmit, in an uplink shared channel resource of the transmission time interval format that differs from the symbol period, an uplink message comprising uplink data multiplexed with the feedback based at least in part on the conflict.

28. The apparatus of claim 27, wherein the instructions are further executable by the one or more processors to cause the apparatus to:

receive a grant indicating the uplink shared channel resource that occurs after an uplink control channel resource of the transmission time interval format.

29. The apparatus of claim 27, wherein the instructions are further executable by the one or more processors to cause the apparatus to:

receive a respective semi-persistent scheduled downlink transmission of the semi-persistent scheduled downlink transmissions via the periodic resources based at least in part on the control signaling.

30. An apparatus for wireless communication at a network entity, comprising:

one or more processors;

one or more memories coupled with the one or more processors; and instructions stored in the one or more memories and executable by the one or more processors to cause the apparatus to:

transmit control signaling configuring periodic resources for receiving semi-persistent scheduled downlink transmissions;

transmit a control message indicating a change to a transmission time interval format;

identify a conflict for a symbol period between uplink transmission of feedback for a first semi-persistent scheduled downlink transmission and for downlink reception based at least in part on the change to the transmission time interval format; and receive, in an uplink shared channel resource of the transmission time interval format that differs from the symbol period, an uplink message comprising uplink data multiplexed with the feedback based at least in part on the conflict.

* * * * *